United States Patent
Wang

(10) Patent No.: US 12,495,156 B2
(45) Date of Patent: Dec. 9, 2025

(54) DETERMINING PREDICTION SAMPLES OF PIXELS BASED ON COLOR SAMPLING MODE OF THE PICTURE BLOCK

(71) Applicant: Tencent Technology (Shenzhen) Company Limited, Guangdong (CN)

(72) Inventor: Yingbin Wang, Shenzhen (CN)

(73) Assignee: TENCENT TECHNOLOGY (SHENZHEN) COMPANY LIMITED, Guangdong (CN)

( * ) Notice: Subject to any disclaimer, the term of this patent is extended or adjusted under 35 U.S.C. 154(b) by 194 days.

(21) Appl. No.: 17/986,811

(22) Filed: Nov. 14, 2022

(65) Prior Publication Data

US 2023/0078064 A1    Mar. 16, 2023

Related U.S. Application Data

(63) Continuation of application No. PCT/CN2022/075550, filed on Feb. 8, 2022.

(30) Foreign Application Priority Data

Feb. 24, 2021 (CN) .......................... 202110209576.9

(51) Int. Cl.
*H04N 19/513* (2014.01)
*H04N 19/182* (2014.01)
*H04N 19/186* (2014.01)

(52) U.S. Cl.
CPC ......... *H04N 19/513* (2014.11); *H04N 19/182* (2014.11); *H04N 19/186* (2014.11)

(58) Field of Classification Search
CPC .. H04N 19/513; H04N 19/182; H04N 19/186; H04N 19/167; H04N 19/105;
(Continued)

(56) References Cited

U.S. PATENT DOCUMENTS

2014/0092983 A1* 4/2014 Joshi ..................... H04N 19/70
375/240.18

FOREIGN PATENT DOCUMENTS

CN         103119943 A      5/2013
CN         105992003 A     10/2016
(Continued)

OTHER PUBLICATIONS

Office Action received for Chinese Patent Application No. 202110209576.9, mailed on Jun. 1, 2024, 26 pages (12 pages of English Translation and 14 pages of Original Document).

(Continued)

*Primary Examiner* — Maria E Vazquez Colon
(74) *Attorney, Agent, or Firm* — ARENTFOX SCHIFF LLP

(57) ABSTRACT

A method for determining a prediction sample of a picture block includes acquiring a type of a current pixel string where a current pixel in a current picture block is located, and determining a reference pixel value of the current pixel according to the type of the current pixel string. The method further includes obtaining a prediction sample of the current pixel according to a color sampling mode of the current picture block and the reference pixel value of the current pixel. A color sampling mode of the obtained prediction sample is consistent with the color sampling mode of the current picture block. The method further includes obtaining prediction values of the current picture block according to the prediction sample of the current pixel.

20 Claims, 9 Drawing Sheets

(58) Field of Classification Search
CPC ............ H04N 19/176; H04N 21/2343; H04N 21/4402; H04N 19/103
See application file for complete search history.

(56) References Cited

FOREIGN PATENT DOCUMENTS

| | | | | |
|---|---|---|---|---|
| CN | 107770543 A | | 3/2018 | |
| CN | 112565749 A | * | 3/2021 | ........... H04N 19/103 |
| KR | 20200098433 A | | 8/2020 | |

OTHER PUBLICATIONS

International Search Report and Written Opinion in PCT/CN2022/075550, mailed on Apr. 25, 2022, 9 pages.

* cited by examiner

| (0, 0) | (1, 0) | (2, 0) | (3, 0) |
|--------|--------|--------|--------|
| (0, 1) | (1, 1) | (2, 1) | (3, 1) |
| (0, 2) | (1, 2) | (2, 2) | (3, 2) |
| (0, 3) | (1, 3) | (2, 3) | (3, 3) |

| (0, 0) | (1, 0) |
|--------|--------|
| (0, 1) | (1, 1) |

| (0, 0) | (1, 0) |
|--------|--------|
| (0, 1) | (1, 1) |
| (0, 2) | (1, 2) |
| (0, 3) | (1, 3) |

DETERMINING PREDICTION SAMPLES OF PIXELS BASED ON COLOR SAMPLING MODE OF THE PICTURE BLOCK

RELATED APPLICATIONS

This application is a continuation of International Application No. PCT/CN2022/075550, entitled "IMAGE BLOCK PREDICTION SAMPLE DETERMINING METHOD, AND ENCODING AND DECODING DEVICES," filed on Feb. 8, 2022, which claims priority to Chinese Patent Application No. 202110209576.9, entitled "METHOD FOR DETERMINING PREDICTION SAMPLE OF PICTURE BLOCK, CODING DEVICE AND DECODING DEVICE" filed on Feb. 24, 2021. The entire disclosures of the prior applications are hereby incorporated by reference.

FIELD OF THE TECHNOLOGY

The embodiment of this application relates to the technical field of picture processing, including a method for determining a prediction sample of a picture block, a coding device and a decoding device.

BACKGROUND OF THE DISCLOSURE

At present, video data is compressed by reducing or eliminating redundant information in the video data via space prediction or time prediction. Motion compensation is a common type of prediction method for video coding, and a predicted value of a current coding block is derived out of a coded area based on redundancy characters of video content in a time domain or a space domain. A prediction method based on motion compensation includes: inter prediction, intra block copy, intra string copy, etc. An intra string copy prediction method divides a coding block into a series of pixel strings according to a certain scanning sequence. An encoder codes type, length and predicted value information of various strings of the current coding block in a code stream. Correspondingly, a decoder derives a prediction sample of a current picture block according to the type, length and predicted value information, carried in the code stream, of various strings, and determines a reestablishment value of the current picture block according to the prediction sample of the current picture block.

However, too much internal memory is occupied when the decoding end derives the prediction sample at present.

SUMMARY

This disclosure provides a method for determining a prediction sample of a picture block, a coding device and a decoding device, which reduce an internal memory size needed for deriving the prediction sample at a decoding end and facilitate hardware implementation.

In an embodiment, a method for determining a prediction sample of a picture block includes acquiring a type of a current pixel string where a current pixel in a current picture block is located, and determining a reference pixel value of the current pixel according to the type of the current pixel string. The method further includes obtaining a prediction sample of the current pixel according to a color sampling mode of the current picture block and the reference pixel value of the current pixel. A color sampling mode of the obtained prediction sample is consistent with the color sampling mode of the current picture block. The method further includes obtaining prediction values of the current picture block according to the prediction sample of the current pixel.

In an embodiment, an apparatus for determining a prediction sample of a picture block includes processing circuitry configured to acquire a type of a current pixel string where a current pixel in a current picture block is located, and determine a reference pixel value of the current pixel according to the type of the current pixel string. The processing circuitry is further configured to obtain a prediction sample of the current pixel according to a color sampling mode of the current picture block and the reference pixel value of the current pixel. A color sampling mode of the obtained prediction sample is consistent with the color sampling mode of the current picture block. The processing circuitry is further configured to obtain prediction values of the current picture block according to the prediction sample of the current pixel.

In an embodiment, a non-transitory computer-readable storage medium stores computer-readable instructions thereon, which, when executed by a computer device, cause the computer device to perform a method for determining a prediction sample of a picture block. The method includes acquiring a type of a current pixel string where a current pixel in a current picture block is located, and determining a reference pixel value of the current pixel according to the type of the current pixel string. The method further includes obtaining a prediction sample of the current pixel according to a color sampling mode of the current picture block and the reference pixel value of the current pixel. A color sampling mode of the obtained prediction sample is consistent with the color sampling mode of the current picture block. The method further includes obtaining prediction values of the current picture block according to the prediction sample of the current pixel According to a technical solution provided by this disclosure, a type of a current string where a current pixel point in a current picture block is located is acquired; a reference pixel value of the current pixel point is determined according to the type of the current string; a color sampling mode of the current picture block is determined; a prediction sample of the current pixel point is obtained according to the color sampling mode of the current picture block and the reference pixel value of the current pixel point; and a prediction sample of the current picture block is obtained according to the prediction sample of the current pixel point. A decoding end or a coding end considers the color sampling mode of the current picture block in the process of determining the reference pixel value of the pixel point in the current picture block, and then makes a color sampling mode of the prediction sample, formed by the prediction sample of the current pixel point, of the current picture block consistent to the color sampling mode of the current picture block. For example, if the color sampling mode of the current picture block is YUV4:2:0, the color sampling mode of the prediction sample of the current picture block is also YUV4:2:0, thereby reducing the occupation of an internal memory in the process of determining the prediction sample of the current picture block.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description show only some embodiments of this disclosure, and a person of ordinary skill in the art may still derive other accompanying drawings from these accompanying drawings.

FIG. 9A is a schematic diagram of a current picture block according to an embodiment of this disclosure.

FIG. 9B is a schematic diagram of a chroma prediction sample of the current picture block shown in FIG. 9A.

FIG. 9C is a schematic diagram of another chroma prediction sample of the current picture block shown in FIG. 9A.

DESCRIPTION OF EMBODIMENTS

The technical solutions in embodiments of this disclosure are described in the following with reference to the accompanying drawings in the embodiments of this disclosure. The described embodiments are merely some rather than all of the embodiments of this disclosure. All other embodiments obtained by a person skilled in the art based on the embodiments of this disclosure shall fall within the protection scope of this disclosure.

It is to be described that in the specification, claims, and accompanying drawings of this disclosure, the terms "first", "second", and the like are intended to distinguish between similar objects but do not necessarily indicate a specific order or sequence. It is to be understood that data used in this way is exchangeable in a proper case, so that the embodiments of this disclosure described herein can be implemented in an order different from the order shown or described herein. Moreover, the terms "include", "contain" and any other variants mean to cover the non-exclusive inclusion. For example, a process, method, system, product, or server that includes a list of steps or units is not necessarily limited to those steps or units, but may include other steps or units not expressly listed or inherent to such a process, method, product, or device.

This disclosure may be applied to the fields of picture coding and decoding, video coding and decoding, hardware video coding and decoding, private circuit video coding and decoding, and real-time video coding and decoding, etc. For example, a scheme of this disclosure may be combined to an audio video coding standard (AVS), such as an H.264/audio video coding (AVC) standard, an H.265/ high efficiency video coding (HEVC) standard and an H.266/ versatile video coding (VVC) standard. Or, the scheme of this disclosure may be combined to other exclusive or industrial standards to be operated, the standards include ITU-TH.261, ISO/IECMPEG-1Visual, ITU-TH.262 or ISO/IECMPEG-2Visual, ITU-TH.263, ISO/IECMPEG-4Visual, ITU-TH.264 (also called as ISO/IECMPEG-4AVC), and scaled video coding (SVC) and multiview video coding (MVC) extension is included. It is to be understood that the technology of this disclosure is not limited to any specific coding and decoding standards or technologies.

Figure 1:
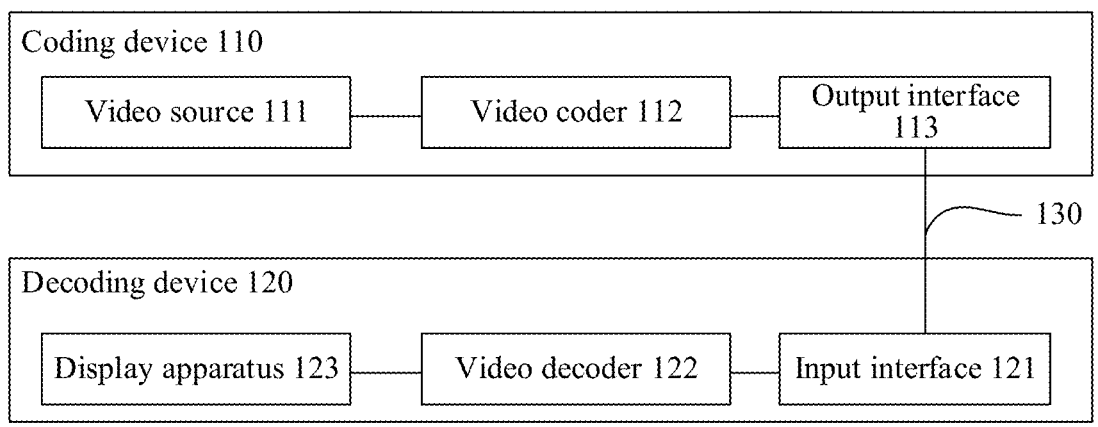
FIG. 1 is a schematic block diagram of a video coding and decoding system according to an embodiment of this disclosure.

To facilitate understanding, a video coding and decoding system according to an embodiment of this disclosure is firstly introduced in combination with FIG. 1.

FIG. 1 is a schematic block diagram of a video coding and decoding system 100 according to an embodiment of this disclosure. It is to be described that FIG. 1 is only an example, and the video coding and decoding system of the embodiment of this disclosure includes but not limited to showing of FIG. 1. As shown in FIG. 1, the video coding and decoding system 100 includes a coding device 110 and a decoding device 120. The coding device is configured to code video data (it may be understood as compression) to generate a code stream and transmit the code stream to the decoding device. The decoding device decodes the code stream generated by coding of the coding device to obtain decoded video data.

The coding device 110 of the embodiment of this disclosure may be understood as a device with a video coding function, the decoding device 120 may be understood as a device with a video decoding function, and namely, the coding device 110 and the decoding device 120 of the embodiment of this disclosure include wider apparatuses, such as a smart phone, a desk computer, a mobile computing apparatus, a notebook (such as a laptop) computer, a tablet personal computer, a set top box, a television, a camera, a display apparatus, a digital media player, a video game console and a vehicle-mounted computer.

In some embodiments, a coding device 110 may transmit coded video data (such as a code stream) to a decoding device 120 through a channel 130. The channel 130 may include one or more media and/or apparatuses capable of transmitting the coded video data to the decoding device 120 from the coding device 110.

In an example, a channel 130 includes one or more communication media capable of making the coding device 110 directly transmit coded video data to a decoding device 120 in real time. In the example, the coding device 110 may modulate the coded video data according to a communication standard and transmit the modulated video data to the decoding device 120. The communication media includes wireless communication media such as a radio-frequency spectrum, and, the communication media may further include wired communication media such as one or more physical transmission lines.

In another example, a channel 130 includes a storage medium capable of storing video data coded by a coding device 110. The storage medium includes a plurality of local access type data storage media such as a light disk, a digital video disk (DVD) and a flash memory. In the example, a decoding device 120 may acquire the coded video data from the storage medium.

In another example, a channel 130 may include a storage server capable of storing video data coded by a coding device 110. In the example, a decoding device 120 may download the coded video data from the storage server. The storage server may store the coded video data and transmit the coded video data to the decoding device 120 such as a web server (such as, for a website), and a file transfer protocol (FTP) server.

In some embodiments, a coding device 110 includes a video coder 112 and an output interface 113. The output interface 113 may include a modulator/demodulator (modem) and/or a transmitter.

In some embodiments, a coding device 110 may further include a video source 111 besides a video coder 112 and an output interface 113.

The video source 111 may include at least one of a video capture apparatus (such as a video camera), a video archive, a video input interface and a computer graphics system, where the video input interface is configured to receive video data from a video content supplier, and the computer graphics system is configured to generate the video data.

The video coder 112 codes the video data from the video source 111 to generate a code stream. The video data may include one or more pictures or sequences of pictures. The code stream includes coding information of the pictures or the sequences of pictures in a bit stream form. The coding information may include coded picture data or associated data. The associated data may include a sequence parameter set (SPS), a picture parameter set (PPS) and other syntactic structures. The SPS may include parameters applied to one or more sequences. The PPS may include parameters applied to one or more pictures. The syntactic structures are collections of zero or more syntactic elements arranged in an assigned sequence in the code stream.

The video coder 112 directly transmits the coded video data to the decoding device 120 through the output interface 113. The coded video data may be stored in a storage medium or a storage server to be later read by the decoding device 120.

In some embodiments, a decoding device 120 includes an input interface 121 and a video decoder 122.

In some embodiments, a decoding device 120 may further include a display apparatus 123 besides an input interface 121 and a video decoder 122.

The input interface 121 includes a receiver and/or a modem. The input interface 121 may receive coded video data through a channel 130.

The video decoder 122 is configured to decode the coded video data to obtain decoded video data and transmit the decoded video data to the display apparatus 123.

The display apparatus 123 displays the decoded video data. The display apparatus 123 may be integrated with the decoding device 120 or arranged outside the decoding device 120. The display apparatus 123 may include more types of display apparatuses such as a liquid crystal display (LCD), a plasma display, an organic light-emitting diode (OLED) display, or a display apparatus of another type.

In addition, FIG. 1 is only an example and a technical solution of the embodiment of this disclosure is not limited to FIG. 1, for example, a technology of this disclosure may be applied to single-side video coding or single-side video decoding.

The video encoding framework involved in the embodiments of this disclosure is described below.

Figure 2:
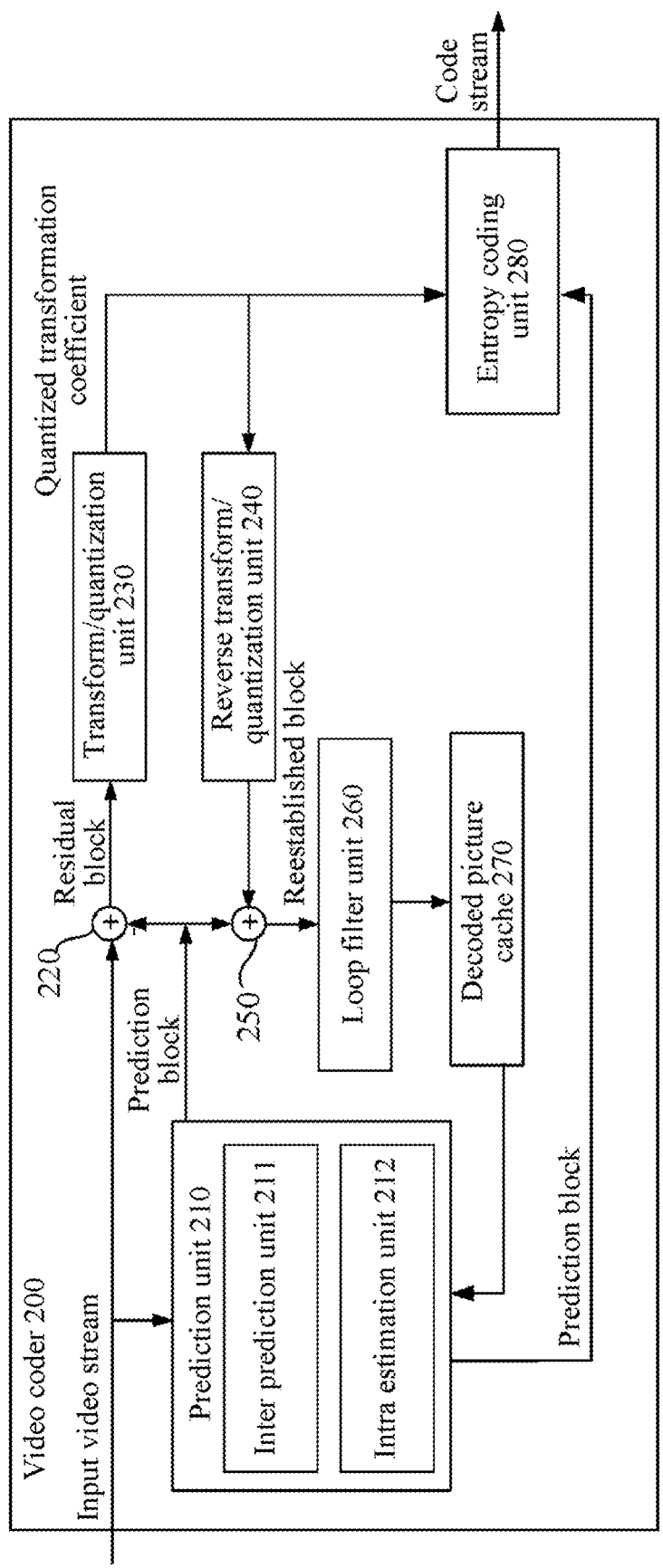
FIG. 2 is a schematic block diagram of a video coder according to an embodiment of this disclosure.

FIG. 2 is a schematic block diagram of a video coder 200 according to an embodiment of this disclosure. It is to be understood that the video coder 200 may be configured to perform lossy compression or lossless compression on pictures. Lossless compression may be visually lossless compression or mathematically lossless compression.

The video coder 200 may be applied to picture data in a luminance and chroma (YCbCr, YUV) format.

For example, the video coder 200 reads video data, and for each frame of picture in the video data, divides one frame of picture into a plurality of coding tree units (CTUs), and in some examples, a CTB may be called as a tree block, a Largest Coding unit (LCU) or a coding tree block (CTB). Each CTU may be associated with a pixel block the same with the CTU in size in a picture. Each pixel may correspond to sampling of one luminance or luma and sampling of two degrees of chrominance or chroma. Thus, each CTU may be associated with one luminance sampling block and two chroma sampling blocks. A CTU may be 128×128, 64×64, 32×32, etc., in size. One CTU may be continuously divided into a plurality of Coding Units (CUs) for coding, and the CUs may be rectangular blocks or square blocks. Each CU may be further divided into a prediction Unit (PU) and a transform unit (TU), and thus, coding, predicting, transform separating and processing are more flexible. In an example, each CTU is divided into CUs in a quadtree mode, and each CU is divided into a TU and a PU in a quadtree mode.

The video coder and a video decoder may support PUs of different sizes. Assuming that the size of a specific CU is 2N×2N, the video coder and the video decoder may support PUs of 2N×2N or N×N for intra prediction, and support symmetric PUs of 2N×2N, 2N×N, N×2N, N×N or similar sizes for inter prediction. The video coder and the video decoder may further support asymmetric PUs of 2N×nU, 2N×nD, nL×2N and nR×2N for inter prediction.

In some embodiments, as shown in FIG. 2, a video coder 200 may include: a prediction unit 210, a residual unit 220, a transform/quantization unit 230, a reverse transform/quantization unit 240, a reestablishment unit 250, a loop filter unit 260, a decoded picture cache 270 and an entropy coding unit 280. It is to be described that the video coder 200 may include more, less or different function modules.

In this disclosure, a current block may be called as a current CU or a current PU or the like. A prediction block may also be called as a prediction picture block or a picture prediction block, and a reestablished picture block may also be called as a reestablished block or a picture-reestablished picture block.

In some embodiments, a prediction unit 210 includes an inter prediction unit 211 and an intra prediction unit 212. Since strong relevance exists between adjacent pixels in a frame of a video, space redundancy between the adjacent pixels is eliminated by an intra prediction method in a video coding and decoding technology. Since strong similarity exists between adjacent frames in the video, time redundancy between the adjacent frames is eliminated by an inter prediction method in the video coding and decoding technology so as to improve coding efficiency.

The inter prediction unit 211 may be configured for inter prediction, inter prediction may refer to picture information of different frames, uses motion information for searching for a reference block from reference frames and generates a prediction block according to the reference block so as to eliminate time redundancy; and frames used by inter prediction may be P-frames and/or B-frames, the P-frames refer to forward prediction frames, and the B-frames refer to bidirectional prediction frames. The motion information includes a reference frame list where the reference frames are located, a reference frame index and a motion vector. The motion vector may be in an integer pixel type or a sub-pixel type, if the motion vector is in the sub-pixel type, a block of a needed sub-pixel needs to be made in the reference frames through interpolation filtering, and a block of an integer pixel or a sub-pixel found, according to the motion vector, in the reference frames is called as the reference block. Some technologies may directly adopt a reference block as a prediction block, and some technologies may perform reprocessing on the basis of a reference block to generate a prediction block. The reprocessing on the basis of a reference block to generate a prediction block may be understood in a manner that the reference block serves as the prediction block, and then, processing is performed on the basis of the prediction block to generate a new prediction block.

Current most common inter prediction methods include: a geometric partitioning mode (GPM) in a VVC standard, and angular weighted prediction (AWP) in an AVS3. The two intra prediction modes have common characteristics.

The intra prediction unit 212 only refers to information of the same frame of picture, and predicts pixel information in a current code picture block for eliminating space redundancy. Frames used by intra prediction may be I-frames.

Totally 35 intra prediction modes including a Planar mode, a DC mode and 33 angular modes are used in HEVC. Totally 67 intra prediction modes including a Planar mode, a DC mode and 65 angular modes are used in VVC. Totally 66 intra prediction modes including a DC mode, a Plane mode, a Bilinear mode and 63 angular modes are used in AVS3.

In some embodiments, the intra prediction unit 212 may be achieved through an intra block copy technology and an intra string copy technology.

A residual unit 220 may generate a residual block of each CU based on a pixel block of each CU and a prediction block of a PU of each CU. For example, the residual unit 220 may generate the residual blocks of the CUs, so that each sample in each residual block has a value equal to a difference between two following parts: a sample in the pixel block of the corresponding CU and a corresponding sample in the prediction block of the PU of the corresponding CU.

A transform/quantization unit 230 may quantize a transformation coefficient. The transform/quantization unit 230 may quantize a transformation coefficient associated with a TU of each CU based on a quantization parameter (QP) value associated with each CU. A video coder 200 may adjust a quantization level applied to the transformation coefficient associated with each CU by adjusting the QP value associated with each CU.

The reverse transform/quantization unit 240 may respectively apply reverse quantization and reverse transformation to the quantized transformation coefficient so as to reestablish the residual blocks according to the quantized transformation coefficient.

A reestablishment unit 250 may add samples of the reestablished residual blocks to corresponding samples of one or more prediction blocks generated by a prediction unit 210 so as to generate reestablished picture blocks associated with the TUs. Sampling blocks of each TU of each CU are reestablished through the mode, and the video coder 200 may reestablish the pixel blocks of each CU.

The loop filter unit 260 may perform block eliminating and filtering operation so as to reduce a blocking effect of the pixel blocks associated with the CUs.

In some embodiments, a loop filter unit 260 includes a block eliminating and filtering unit and a sample adaptive offset/adaptive loop filter (SAO/ALF) unit, where the block eliminating and filtering unit is configured to eliminate a blocking effect, and the SAO/ALF unit is configured to eliminate a ring effect.

A decoded picture cache 270 may store reestablished pixel blocks. An inter prediction unit 211 may use reference pictures including the reestablished pixel blocks to perform inter prediction on PUs of other pictures. In addition, an intra prediction unit 212 may use the reestablished pixel blocks in the decoded picture cache 270 for performing intra prediction on other PUs in pictures the same with CUs.

An entropy coding unit 280 may receive the quantized transformation coefficient from the transform/quantization unit 230. The entropy coding unit 280 may execute one or more entropy coding operations on the quantized transformation coefficient so as to generate data after entropy coding.

Figure 3:
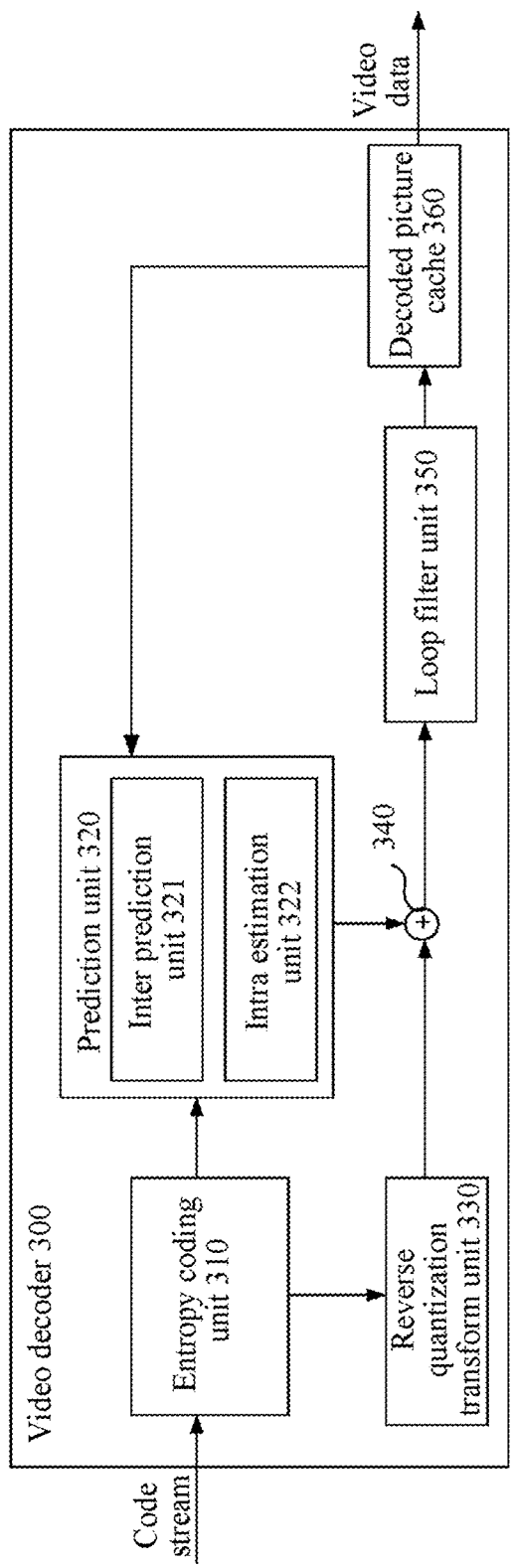
FIG. 3 is a schematic block diagram of a decoding architecture according to an embodiment of this disclosure.

FIG. 3 is a schematic block diagram of a decoding architecture 300 according to an embodiment of this disclosure.

As shown in FIG. 3, a video decoder 300 includes: an entropy decoding unit 310, a prediction unit 320, an inverse quantization/transform unit 330, a reestablishment unit 340, a loop filter unit 350 and a decoded picture cache 360. It is to be described that the video decoder 300 may include more, less or different function modules.

The video decoder 300 may receive a code stream. The entropy decoding unit 310 may analyze the code stream so as to extract syntactic elements from the code stream. As a part for analyzing the code stream, the entropy decoding unit 310 may analyze the syntactic elements, obtained after entropy coding, in the code stream. The prediction unit 320, the inverse quantization/transform unit 330, the reestablishment unit 340 and the loop filter unit 350 may decode video data according to the syntactic elements extracted from the code stream, and then generates the decoded video data.

In some embodiments, a prediction unit 320 includes an inter prediction unit 321 and an intra prediction unit 322.

The intra prediction unit 321 may execute intra prediction so as to generate prediction blocks of PUs. The intra prediction unit 321 may use an intra prediction mode for generating the prediction blocks of the PUs based on the pixel blocks of the spatially-adjacent PUs. The intra prediction unit 321 may further determine the intra prediction mode of the PUs according to one or more syntactic elements analyzed from the code stream.

The inter prediction unit 322 may construct a first reference picture list (list 0) and a second reference picture list (list 1) according to the syntactic elements analyzed from the code stream. In addition, if the PUs use inter prediction for coding, an entropy decoding unit 310 may analyze motion information of the PUs. The inter prediction unit 322 may determine one or more reference blocks of the PUs according to the motion information of the PUs. The inter prediction unit 322 may generate prediction blocks of the PUs according to one or more reference blocks of the PUs.

An inverse quantization/transform unit 330 may reversely quantize (namely, dequantize) a transformation coefficient associated with TUs. The inverse quantization/transform unit 330 may use a QP value associated with CUs of the TUs for determining a quantization level.

After the transformation coefficient is dequantized, the inverse quantization/transform unit 330 may apply one or more inverse transformations to the inverse quantization transformation coefficient so as to generate residual blocks associated with the TUs.

A reestablishment unit 340 reestablishes pixel blocks of the CUs by using the residual blocks associated with the TUs of the CUs and the prediction blocks of the PUs of the CUs. For example, the reestablishment unit 340 may add samples of the residual blocks to corresponding samples of the prediction blocks so as to reestablish the pixel blocks of the CUs, and thereby obtaining a reestablished picture block.

A loop filter unit 350 may perform block eliminating and filtering operation so as to reduce a blocking effect of the pixel blocks associated with the CUs.

A video decoder 300 may store reestablished pictures of the CUs into a decoded picture cache 360. The video decoder 300 may adopt the reestablished pictures in the decoded picture cache 360 as reference pictures for later prediction, or transmit the reestablished pictures to a display device to be displayed.

A basic process of video coding and decoding is as follow: a frame of picture is divided into blocks at a coding end, and for a current block, a prediction unit 210 uses intra prediction or inter prediction for generating a prediction block of the current block. A residual unit 220 may calculate a residual block based on the prediction block and an original block of the current block, namely, a difference between the prediction block and the original block of the current block, and the residual block may also be called as residual information. The residual block is subjected to a transformation and quantization process of a transform/quantization unit 230 so that information to which human eyes are insensitive can be removed so as to eliminate visual redundancy. The residual block not subjected to transformation and quantization via the transform/quantization unit 230 may be called as a time domain residual block, and the time domain residual block obtained after transformation and quantization via the transform/quantization unit 230 may be called as a frequency residual block or a frequency domain residual block. After receiving the quantized transformation coefficient outputted by the transform/quantization unit 230, an entropy coding unit 280 may perform entropy coding on the quantized transformation coefficient to output a code stream. For example, the entropy coding unit 280 may eliminate character redundancy according to a target context model and probabilistic information of a binary code stream.

The entropy decoding unit 310 may analyze the code stream at a decoding end to obtain prediction information, a quantization coefficient matrix, etc., of the current block, and the prediction unit 320 uses intra prediction or inter prediction for the current block based on the prediction information so as to generate a prediction block of the current block. The inverse quantization/transform unit 330 uses the quantization coefficient matrix obtained from the code stream for performing inverse quantization and inverse transformation on the quantization coefficient matrix to obtain the residual block. The reestablishment unit 340 adds the prediction block and the residual block to obtain a reestablished block. The reestablished block constitutes a reestablished picture, and the loop filter unit 350 performs loop filtering on the reestablished picture based on the picture or the block to obtain a decoded picture. The coding end similarly needs operation similar to the decoding end to acquire the decoded picture. The decoded picture may also be called as the reestablished picture serving as an inter prediction reference frame for later frames.

It is to be described that block division information, mode information such as prediction, transformation, quantization, entropy coding and loop filtering, or parameter information, or the like determined at the coding end are carried in the code stream in necessary. The decoding end determines the block division information, mode information such as prediction, transformation, quantization, entropy coding and loop filtering, or parameter information the same with those of the coding end by analyzing the code stream and performing analysis according to existing information so as to guarantee that the decoded picture acquired by the coding end is the same with the decoded picture acquired by the decoding end.

The above content is a basic process of the video coder and the video decoder under a block-based hybrid coding architecture, and along with development of the technology, some modules or steps of the architecture or the process may be optimized, and this disclosure is applicable to the basic process of the video coder and the video decoder under the block-based hybrid coding architecture, but not limited to the architecture and the process.

The intra block copy technology and the intra string copy technology are introduced below.

Figure 4:
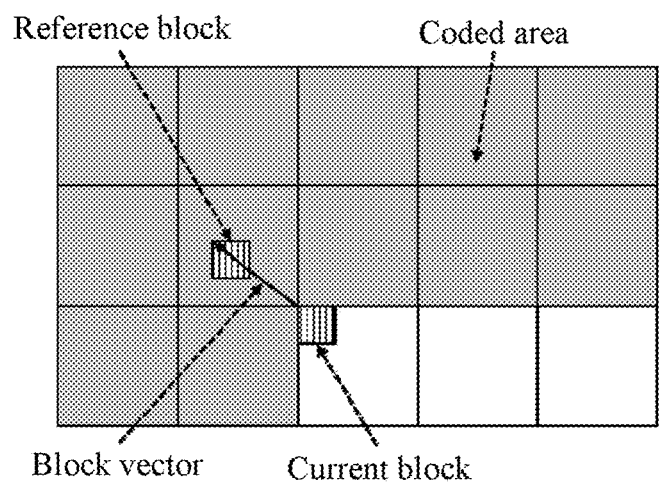
FIG. 4 is a schematic diagram of intra block copy according to an embodiment of this disclosure.

Intra Block Copy (IBC) is an intra-frame coding tool adopted in extension of Screen Content Coding (SCC) in HEVC, and remarkably improves screen content coding efficiency. The IBC technology is also adopted in AVS3 and VVC so as to improve screen content coding performance. The IBC utilizes relevance of a screen content video in space, and uses coded picture pixels of a current picture for predicting pixels of a current to-be-coded block, which can effectively save bits needed for pixel coding. As shown in FIG. 4, displacement between the current coded block and a reference block thereof in IBC is called as a Block Vector (BV). VVC adopts a mode similar to advanced motion vector prediction (AMVP) in inter prediction to predict the BV, and allows to use a resolution ratio of 1 or 4 pixels to code BVD.

Figure 5:
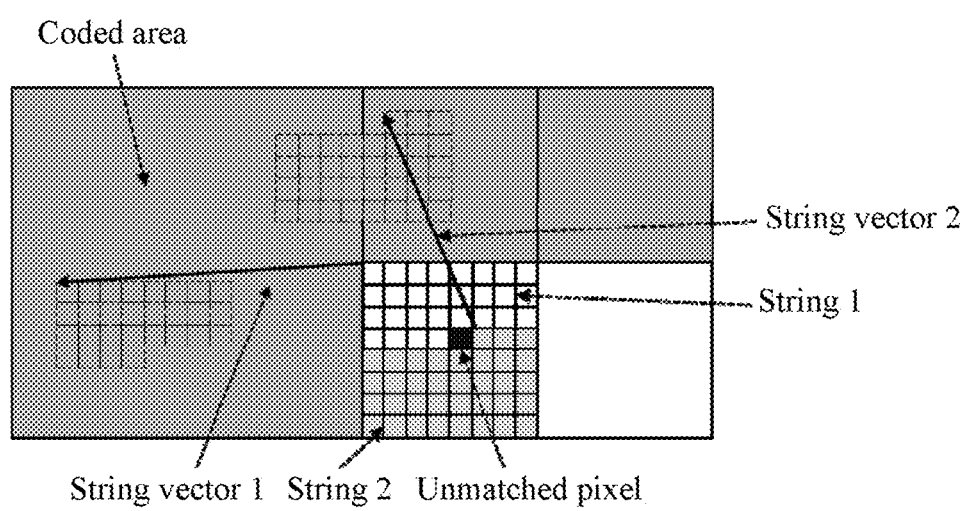
FIG. 5 is a schematic diagram of intra string copy according to an embodiment of this disclosure.

Intra String Copy (ISC) is also called as string copy intra prediction, and the intra string copy technology divides a coded block into a series of pixel strings or unmatched pixels according to a certain scanning sequence (raster scanning, reciprocating scanning, Zig-Zag scanning, etc.). Similar to IBC, a current string searches a coded area of a current frame of picture for a same-shape reference string, prediction information of the current string is derived on that basis, a residual signal of the current string is obtained by coding an original signal and the prediction information of the current string, and the residual signal is coded. For example: FIG. 5 is a schematic diagram of intra string copy according to an embodiment of this disclosure, as shown in FIG. 5, 28 white pixels belong to a string 1, 35 light gray pixels belong to a string 2, and a black pixel shows an unmatched pixel (the unmatched pixel is also called as an acnode, and a pixel value of the unmatched element is directly coded rather than be derived according to a predicted value of the reference string). A reference string of the string 1 is located on its left side, and displacement from the string 1 to the corresponding reference string is shown through a string vector 1. A reference string of the string 2 is located above it, and displacement from the string 2 to the corresponding reference string is shown through a string vector 2.

The intra string copy technology needs to code a String Vector (SV), a string length, whether there is a flag of a matched string or not, etc., corresponding to each string in a current coded block, where, SV represents displacement from a to-be-coded string to a reference string thereof; and the string length represents the number of pixels included in the string.

An equivalence string and unit vector string mode is a submode of intra string copy, and is accepted by AVS3 in October, 2020. Similar to intra string copy, the mode divides a coded/decoded block into a series of pixel strings or unmatched elements according to a certain scanning sequence, and the type of the pixel strings may be an equivalence string or a unit-based vector string. The equivalence string has a characteristic that all pixels in the pixel string have the same predicted value. A unit vector string (also called as the unit-based vector string, a unit shifting string, a copy-upper string, etc.) has characteristics that a displacement vector is (0, −1), implementation is simple, and each pixel in the string uses an upper pixel to serve as a predicted value of a current pixel point. The equivalence string mode needs to code type, length and predicted value information of various strings of a current coded block in a code stream. Correspondingly, a decoding end derives a prediction sample from information obtained through decoding from the code stream.

There are following several methods in predicted value coding modes: 1) Directly code predicted values. 2) Construct a reference pixel candidate list L1 and code indexes of predicted values in L1. 3) Construct a reference pixel prediction list L0, derive a reference pixel candidate list L1 from the list according to reuse_flag, and code indexes of reuse_flag and predicted values in L1. The above method 3) is adopted for coding the predicted values in a current equivalence string implementation mode. The above method records positions of reference pixels in pictures rather than record the predicted values in the lists.

An equivalence string and unit-based vector string mode in AVS3 at present is implemented for video pictures in a YUV420 format, current prediction sample matrixes are recorded as pred_y, pred_cb and pred_cr, the method uses an internal memory with an LCU height, a picture width and a channel number being 3 for deriving a prediction sample recorded as LcuRowBuf[ch][x][y], and then a value of one pixel sample can be determined according to channels, horizontal coordinates and vertical coordinates of color components.

A process of deriving the prediction sample in AVS3 at present includes the following steps:

Step 1: Divide a CU in an equivalence string and unit-based vector string mode into a series of equivalence strings, unit-based vector strings or unmatched pixels, sequentially derive various parts of prediction samples according to a following method, and set coordinates of a current pixel point as (x, y):

under a first situation, if the type of a current string where the current pixel point is located is an equivalence string, the following step 11-step 13 are executed.

Step 11: Perform decoding from a code stream to obtain a reference pixel value of the current pixel point, such as direct decoding from the code stream or conforming through a point vector, and analyzing comp_flag from the code stream, where the comp_flag is configured to indicate whether a chroma component value of the current pixel point exists or not.

Step 12: Perform assignment on a Y-component LcuRowBuf[0][x][y] of a current position (x, y).

Step 13: Perform assignment on a Cb-component LcuRowBuf[1][x][y] and a Cr-component LcuRowBuf[2][x][y] of the current position (x, y) if the chroma component value of the current position (x, y) exists.

Under a second situation, if the type of a string where the current pixel point is located is an unmatched pixel, the following step 21 and step 22 are executed.

Step 21: Perform decoding from the code stream to obtain pixel values LcuRowBuf[0][x][y], LcuRowBuf[1][x][y] and LcuRowBuf[2][x][y] of the Y-component, the Cb-component and the Cr-component if coordinates of the current pixel point are integer multiples of 2 (namely, x%2==0 && y%2==0).

Step 22: Perform decoding from the code stream to obtain a pixel value LcuRowBuf[0][x][y] of the Y-component if the coordinates of the current pixel point are not integer multiples of 2, and set the value of the Cb-component LcuRowBuf[1][x][y] and the value of the Cr-component LcuRowBuf[2][x][y] to be 0.

Under a third situation, if the type of a string where the current pixel point is located is a unit-based vector string, a pixel value of an adjacent pixel point above the current pixel point is used as a reference pixel value of the current pixel point, namely, LcuRowBuf[0][x][y]=LcuRowBuf[0][x][y−1], LcuRowBuf[1][x][y]=LcuRowBuf[1][x][y−1], and LcuRowBuf[2][x][y]=LcuRowBuf[2][x][y−1].

Step 2: Perform downsampling on a prediction sample of a chroma component after prediction samples of the whole CU are derived, and perform downsampling on a w×h chroma sample matrix to obtain a w/2×h/2 chroma sample matrix Specifically, nonzero pixels in each 2×2 subblock in the prediction samples of the whole CU are averaged to obtain a downsampled chroma sample value.

Step 3: Derive values of predy, pred_u and pred_v according to positions of pixel points in the CU, where for a luminance sample, pred_y is a pixel value in LcuRowBuf[0], pred_cb is a chroma sample value after downsampling in LcuRowBuf[1], and pred_cr is a chroma sample value after downsampling in LcuRowBuf[2].

It can be known from above that in current AVS3, for video pictures in a format of YUV4:2:0 or YUV4:2:2, an internal memory being YUV4:4:4 needs to be used when the prediction samples are derived, and the prediction samples occupy a large internal memory space, which not facilitate implementation of hardware devices at a decoding end.

To solve the above technical problems, this disclosure performs downsampling on the reference pixel value of the current pixel point according to a color sampling mode of a current picture block, obtains a prediction sample of the current pixel point, which is consistent to the current picture block in size, reduces occupation of the internal memory needed for prediction sample deriving, and facilitates hardware implementation. Technical solutions provided by embodiments of this disclosure are described in detail in combination with the specific embodiments as below.

It is to be described that a method of this disclosure is applicable to a coding end and a decoding end, and a process of determining prediction samples of a picture block through the coding end is basically similar to a process of determining prediction samples of a picture block through the coding end. Herein, a method for determining a prediction sample of a picture block provided by this disclosure is described exemplarily by the decoding end, and refer to the decoding end if the coding end is adopted.

Figure 6:
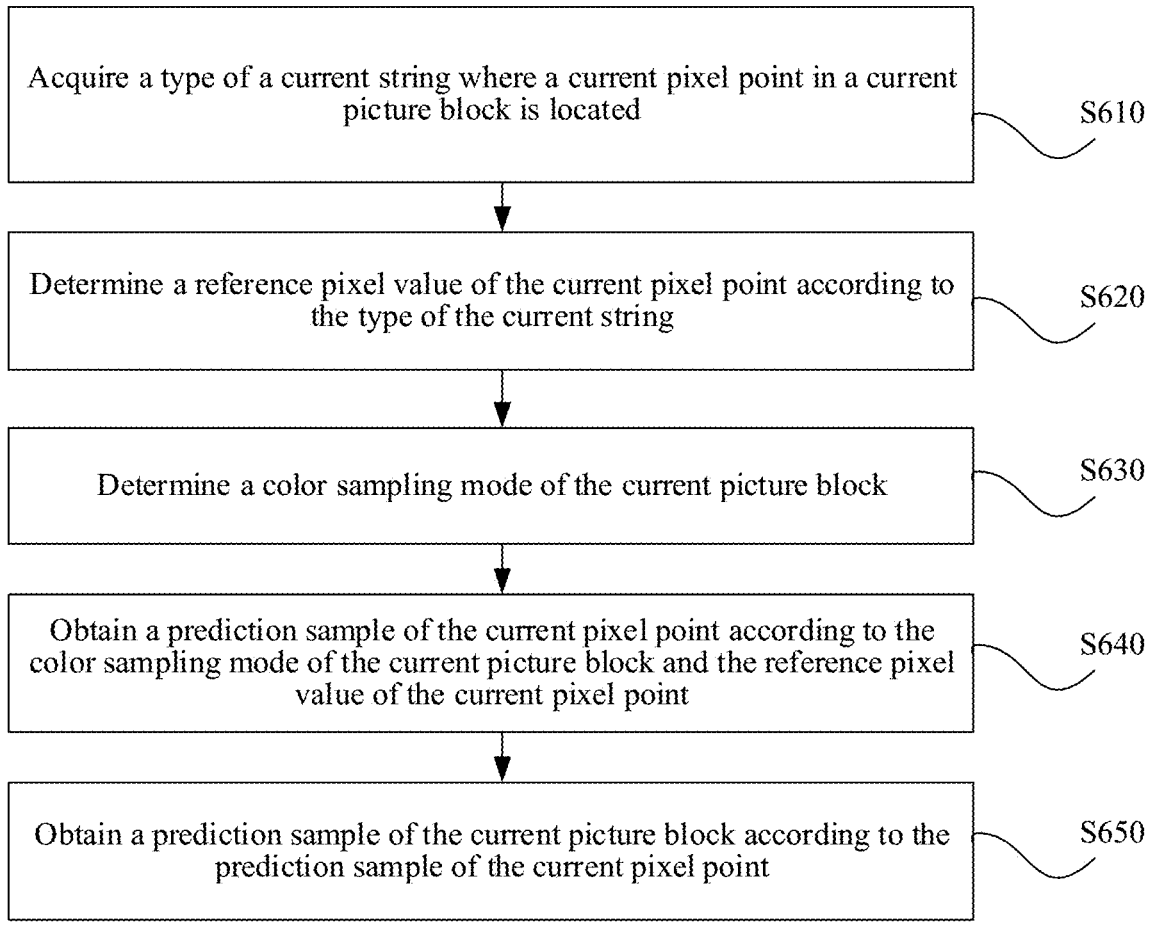
FIG. 6 is a flowchart of a method for determining a prediction sample of a picture block according to an embodiment of this disclosure.

FIG. 6 is a flowchart of a method for determining a prediction sample of a picture block according to an embodiment of this disclosure, and the method of the embodiment of this disclosure is applied to a decoding end shown in FIG. 1 or FIG. 3, and as shown in FIG. 6, the method includes:

S610: Acquire a type of a current string where a current pixel point in a current picture block is located. For example, a type of a current pixel string is acquired. A current pixel in a current picture block is located in the current pixel string.

An execution body of the embodiment of this disclosure includes but not limited to following devices: a coder, a decoder, or a device for determining the prediction sample of the picture block, such as a desk computer, a mobile computing apparatus, a notebook (such as a laptop) computer, a tablet personal computer, a set top box, a smart phone, or other handsets, a television, a camera, a display apparatus, a digital media player, a video game console, a vehicle-mounted computer, or other similar devices.

The current picture block is divided into a series of pixel strings according to a certain scanning sequence at the coding end, each pixel string includes at least one pixel point, and the type of the pixel strings may be an equivalence string or a unit vector string, or an unmatched pixel.

The coding end codes length, type and predicted value information of the pixel strings into a code stream. Accordingly, when decoding the current picture block, the decoding end may decode the type of the current string where the current pixel point in the current picture block is located from the code stream, the current picture block includes the current string, and the current string includes at least one pixel point.

In an embodiment, the type of the current string includes any one of: the equivalence string, the unmatched pixel and the unit-based vector string.

S620: Determine a reference pixel value of the current pixel point according to the type of the current string (current pixel string).

In some embodiments, if the type of a current string is an equivalence string, a code stream is decoded to obtain an index of a reference pixel value corresponding to the current string, a preset reference pixel prediction list is inquired (checked) for the reference pixel value corresponding to the index, and the reference pixel value corresponding to the index is determined as the reference pixel value of the current pixel point.

Exemplarily, the preset reference pixel prediction list is shown in Chart 1:

CHART 1

| Index | Reference pixel value |
|---|---|
| 1 | A1 |
| 2 | A2 |
| 3 | A3 |
| ... | ... |

Since all pixel points in the equivalence string have the same reference pixel value, if the type of the current string is the equivalence string, the coding end codes an index of the reference pixel value corresponding to the current string into the code stream, for example, the reference pixel value corresponding to all the pixel points in the current string is A2, the index of the reference pixel value A2 is 2, and the coding end codes the index 2 into the code stream. The decoding end decodes the code stream to obtain the index of the reference pixel value corresponding to the current string, such as 2, the Chart 1 is inquired for the reference pixel value A2 corresponding to the index 2, and the reference pixel value A2 is determined as the reference pixel value corresponding to the current string.

Since reference pixel values corresponding to all the pixel points in the current string are A2, the reference pixel value of the current pixel point may be determined as A2.

In some embodiments, if the type of a current string is an unmatched pixel, a code stream is decoded to obtain a predicted value of a current pixel point, and the predicted value of the current pixel point is determined as a reference pixel value of the current pixel point.

Specifically, if the type of the current string is the unmatched pixel, it indicates that the current string includes one pixel point, such as an unmatched pixel shown in a black area in FIG. 5, and the unmatched pixel is the current pixel point. During coding, a coding end codes the predicted value of the unmatched pixel into the code stream. If the current pixel point is an unmatched pixel point, a decoding end may directly perform decoding from the code stream to obtain a predicted value of the current pixel point, and then, determines the predicted value of the current pixel point as a reference pixel value of the current pixel point.

In some embodiments, if the type of a current string is a unit-based vector string, a value of an adjacent decoded pixel point above a current pixel point is determined as a reference pixel value of the current pixel point.

Specifically, each pixel point in the unit-based vector string uses a value of an upper adjacent pixel point as a reference pixel value, thus, if the type of the current string is the unit-based vector string, the decoding end determines the value of the adjacent decoded pixel point above the current pixel point as the reference pixel value of the current pixel point.

S630: Determine a color sampling mode of the current picture block.

During coding, the coding end divides a to-be-coded current picture into a plurality of picture blocks, and when each picture block is coded, the decoding end correspondingly decodes each picture block in the current picture. Thus, the color sampling mode for the current picture block in the embodiment of this disclosure is a color sampling mode for the picture with the current picture block.

In some embodiments, a color format of a video picture in the embodiment of this disclosure is YUV. YUV is mainly configured to optimize transmission of color video signals. Compared with RGB video signal transmission, YUV has a greatest advantage of only occupying minimal bandwidth (RGB requires three independent video signals to be transmitted simultaneously). "Y" represents Luminance or Luma, namely a gray-scale value. "U" and "V" represent Chrominance or Chroma, and have a function of describing picture colors and saturation for assigning pixel colors. Luminance is established through a RGB input signal, and a method is about stacking specific parts of the RGB signals. Chroma designs hue Cr and saturation Cb of colors. Cr reflects a difference between a RGB input signal red part and a RGB signal luminance value. Cb reflects a difference between a RGB input signal blue part and the RGB signal luminance value. The importance of adopting a YUV color space is that a luminance signal Y and chroma signals U and V of the YUV color space are separated. If there is only a Y signal component without U and V components, a shown picture is a black-white-gray picture. The reason why a color television adopts the YUV space is about using the luminance signal Y to solve a compatibility problem between the color television and a black and white television and making the black and white television also receive color television signals.

A storage format of the YUV code stream is closely related to color sampling modes of the YUV code stream, there are three mainstream color sampling modes: YUV4: 4:4, YUV4:2:2, YUV4:2:0, and a proportion being N1:N2: N3 with numbers referring to relative sampling rates in a horizontal direction, where, N1 represents the number of samples Y in odd-numbered rows and even-number rows, N2 represents the number of samples U and V in odd-numbered rows, and N3 represents the number of samples U and V in even-numbered rows.

Figure 7A:
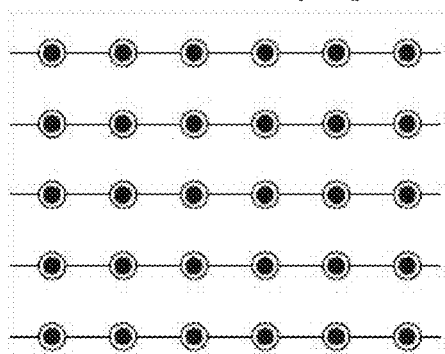
FIG. 7A is a schematic diagram of a color sampling mode according to an embodiment of this disclosure.

As shown in FIG. 7A, YUV4:4:4 shows that downsampling is not performed on a chroma channel, namely each sample Y corresponds to a set of samples U and V.

Figure 7B:
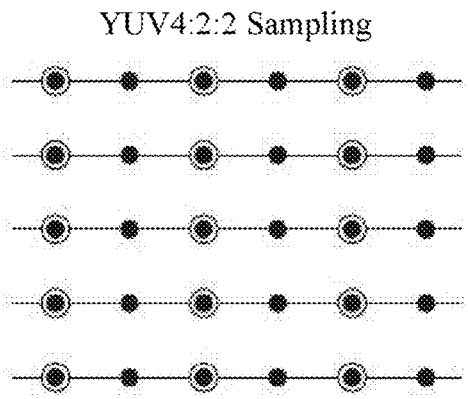
FIG. 7B is a schematic diagram of another color sampling mode according to an embodiment of this disclosure.

As shown in FIG. 7B, YUV4:2:2 represents 2:1 horizontal downsampling without vertical downsampling. Namely, every two samples U or V correspond to four samples Y when each line is scanned. Namely, every two samples Y share one set of UV components.

Figure 7C:
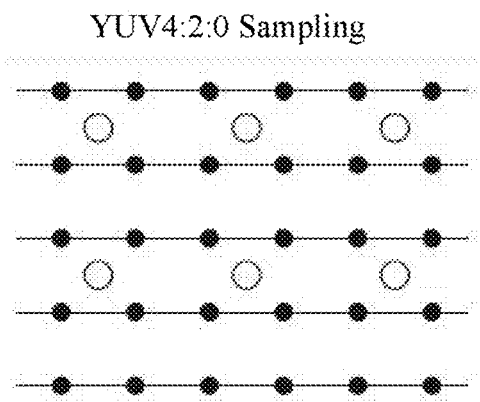
FIG. 7C is a schematic diagram of another color sampling mode according to an embodiment of this disclosure.

As shown in FIG. 7C, YUV4:2:0 represents 2:1 horizontal downsampling and 2:1 vertical downsampling, namely every four samples Y share one set of UV samples.

It is to be described that the color sampling modes involved in the embodiment of this disclosure include but not limited to FIG. 7A, FIG. 7B and FIG. 7C. In an embodiment, a color sampling mode for downsampling a luminance component is further included, such as YUV3:2:0 and YUV3:2:2.

In some embodiments, a color sampling mode of a current picture block is default, for example, a coding end and a decoding end make the default color sampling mode of the current picture block as YUV4:2:0.

In some embodiments, a coding end carries color sampling mode information of a current picture block in a code stream, and therefore a decoding end can obtain a color sampling mode of the current picture block by decoding the code stream.

S640: Obtain a prediction sample of the current pixel point according to the color sampling mode of the current picture block and the reference pixel value of the current pixel point. For example, a prediction sample of the current pixel is obtained according to a color sampling mode of the current picture block and the reference pixel value of the current pixel, such that a color sampling mode of the obtained prediction sample is consistent with the color sampling mode of the current picture block.

Specifically, the decoding end obtains the color sampling mode of the current picture block and the reference pixel value of the current pixel point according to the above steps, and then, obtains the prediction sample of the current pixel point according to the color sampling mode of the current picture block and the reference pixel value of the current pixel point, namely, when the decoding end of this disclosure determines the prediction sample of the current pixel point, the color sampling mode of the current picture block is considered so as to make the determined color sampling mode of the prediction sample of the current pixel point consistent to the color sampling mode of the current picture block, thereby reducing an occupied internal memory.

S650: Obtain the prediction sample of the current picture block according to the prediction sample of the current pixel point. For example, prediction values of the current picture block are obtained according to the prediction sample of the current pixel.

Specifically, the current pixel point is one pixel point in the current picture block, a prediction sample of each of other pixel points in the current picture block is determined in reference to a determining process of the prediction sample of the current pixel point, and the prediction samples (prediction values) of all the pixel points in the current picture block constitute the prediction sample of the current picture block.

According to the embodiment of this disclosure, the decoding end obtains the prediction sample of the current pixel point according to the color sampling mode of the current picture block and the reference pixel value of the current pixel point. The decoding end considers the color sampling mode of the current picture block in the process of determining the reference pixel value of the pixel point in the current picture block, and then makes a color sampling mode of the prediction sample, formed by the prediction samples of the pixel points, of the current picture block consistent to the color sampling mode of the current picture block. For example, if the color sampling mode of the current picture block is YUV4:2:0, the color sampling mode of the prediction sample of the current picture block is also YUV4:2:0, if the color sampling mode of the current picture block is YUV4:2:2, the color sampling mode of the prediction sample of the current picture block is also YUV4:2:2, and compared with the related art that an internal memory being YUV4:4:4 is used for deriving a prediction sample for downsampling, this disclosure reduces the occupation of the internal memory in the process of determining the prediction sample of the current picture block.

In addition, this disclosure directly obtains the prediction sample of the current picture block according to the prediction samples of the pixel points in the current picture block without downsampling, then, reduces operation complexity and increases the speed of determining the prediction sample of the current picture block.

S640 is introduced in detail in combination with the specific embodiments as below.

In some embodiments, if a prediction sample of a current pixel point includes a luminance prediction sample, and at the time, S640 includes a following step S640-A:

S640-A: Determine a luminance value of a reference pixel of the current pixel point as a luminance prediction sample of the current pixel point if a color sampling mode of a current picture block is a mode for downsampling a chroma component.

The mode for downsampling the chroma component may be a mode for performing first downsampling on the chroma component or a mode for performing second downsampling on the chroma component. The mode for performing first downsampling on the chroma component specifically may be a YUV4:2:0 color sampling mode, and the mode for performing second downsampling on the chroma component may be a YUV4:2:2 color sampling mode.

For example, assuming that position coordinates of the current pixel point are (x, y), the position coordinates of the current pixel point may be understood as position coordinates of the current pixel point in a to-be-decoded picture, and may also be understood as position coordinates of the current pixel point in the current picture block. Assuming that the luminance value of the reference pixel of the current pixel point is recorded as pixel_luma, If the color sampling mode of the current picture block is YUV4:2:2 or YUV4:2:0, the luminance value of the reference pixel of the current pixel point is determined as the luminance prediction sample of the current pixel point, for example, a value of pic_luma (x,y) is set as pixel_luma.

Each pixel point in the current picture block serves as a current pixel point, a luminance prediction sample of each pixel point in the current picture block is determined according to the above steps, and the luminance prediction samples of all the pixel points in the current picture block constitute a prediction sample of the prediction sample of the current picture block under the luminance component. The prediction sample under the luminance component is the same with the current picture block in size, for example, if the size of the current picture block is 16×16, the size of the current picture block in each luminance prediction sample is also 16×16. 16×16 represents 16 rows of pixels and 16 columns of pixels.

Figure 8:
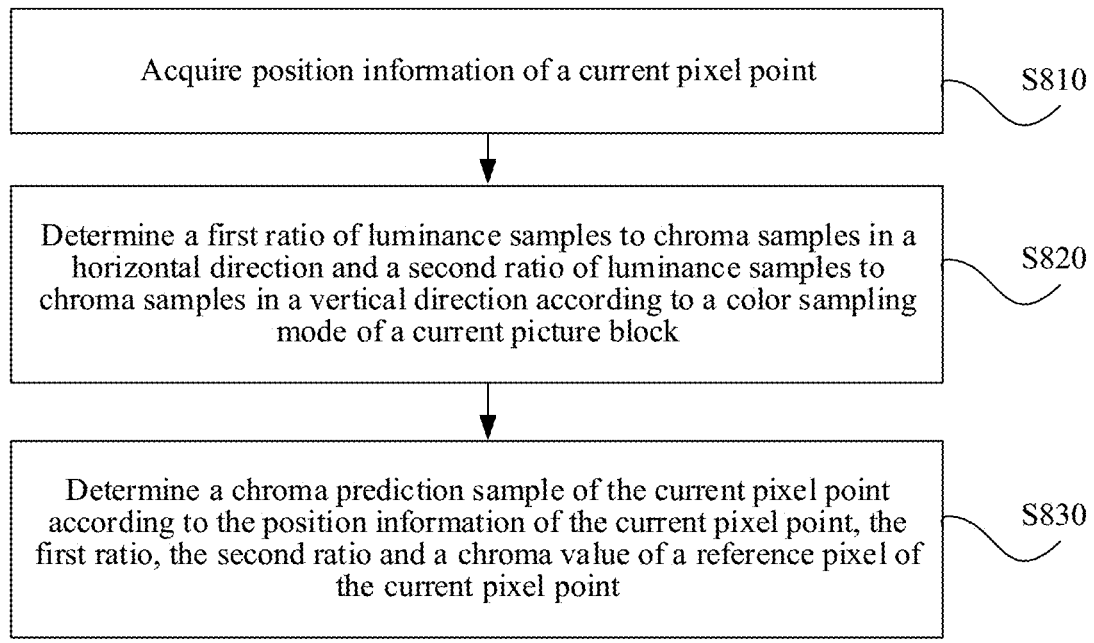
FIG. 8 is a schematic flowchart of another method for determining a prediction sample of a picture block according to an embodiment of this disclosure.

In some embodiments, if a prediction sample of a current pixel point includes a chroma prediction sample, S640 includes steps shown in FIG. 8.

FIG. 8 is a schematic flowchart of another method for determining a prediction sample of a picture block according to an embodiment of this disclosure, and as shown in FIG. 8, S640 includes the following steps:

S810: Acquire position information of a current pixel point.

In some embodiments, position information of a current pixel point may be position coordinates of the current pixel point in a to-be-decoded picture.

In some embodiments, position information of a current pixel point may be position coordinates of the current pixel point in a current picture block.

In some embodiments, position information of a current pixel point includes a first horizontal coordinates and a first vertical coordinate, for example, if the position information of the current pixel point is (x,y), x is the first horizontal coordinate, and y is the first vertical coordinate.

S820: Determine a first ratio of luminance samples to chroma samples in a horizontal direction and a second ratio of luminance samples to chroma samples in a vertical direction according to a color sampling mode of a current picture block.

Exemplarily, if the color sampling mode of the current picture block is YUV4:4:4, as shown in FIG. 7A, there are four chroma samples for every four luminance samples in the horizontal direction, and namely, the first ratio is 1. There are four chroma samples for every four luminance samples in the vertical direction, and namely, the second ratio is also 1.

In some embodiments, if a color sampling mode of a current picture block is a mode for performing second downsampling on a chroma component, a first ratio is a target value, and the second ratio is a half of the target value. The target value is calculated according to the number of the luminance samples and the number of the chroma samples in the horizontal direction.

Exemplarily, if the color sampling mode of the current picture block is YUV4:2:2, as shown in FIG. 7A, there are two chroma samples for every four luminance samples in the horizontal direction, and namely, the first ratio is 2. There are four chroma samples for every four luminance samples in the vertical direction, and namely, the second ratio is 1.

In some embodiments, if a color sampling mode of a current picture block is a mode for performing first downsampling on a chroma component, a first ratio and a second ratio are both target values.

Exemplarily, if the color sampling mode of the current picture block is YUV4:2:0, as shown in FIG. 7C, there are two chroma samples for every four luminance samples in the horizontal direction, and namely, the first ratio is 2. There are two chroma samples for every four luminance samples in the vertical direction, and namely, the second ratio is 2.

S830: Determine a chroma prediction sample of the current pixel point according to the position information of the current pixel point, the first ratio, the second ratio and a chroma value of a reference pixel of the current pixel point.

Specifically, a decoding end determines a first position of the chroma prediction sample of the current pixel point according to the position information of the current pixel point, the first ratio and the second ratio, and the chroma prediction sample at the first position serves as the chroma prediction sample of the current pixel point.

In some embodiments, S830 includes the following steps:

S830-A1: Determine a first position according to a first horizontal coordinate, a first ratio, a first vertical coordinate and a second ratio if the first horizontal coordinate is an integer multiple of the first ratio and the first vertical coordinate is an integer multiple of the second ratio.

S830-A2: Adopt a chroma value of a reference pixel of a current pixel point as a chroma prediction sample at the first position.

S830-A3: Adopt the chroma prediction sample at the first position as a chroma prediction sample of the current pixel point.

For example, position information of the current pixel point is (x, y), where x is the first horizontal coordinate of the current pixel point, and y is the first vertical coordinate of the current pixel point. The decoding end judges whether the first horizontal coordinate of the current pixel point is an integer multiple of the first ratio or not and whether the first vertical coordinate is an integer multiple of the second ratio or not. Exemplarily, assuming that the first ratio is expressed by scale_x, and the second ratio is expressed by scale_y, judge whether the current pixel point meets a following formula (1):

$$x \% \text{scale\_}x = 0 \ \text{H} \ y \% \text{scale\_}y = 0 \qquad (0)$$

where, % is remainder operation, and ═ is equal.

If the color sampling mode of the current picture block is YUV4:2:2, scale_x is 2, and scale_y is 1.

If the color sampling mode of the current picture block is YUV4:2:0, scale_x is 2, and scale_y is 2.

Exemplarily, if the color sampling mode of the current picture block is YUV4:2:0, as shown in FIG. 7C, there are two chroma samples for every four luminance samples in the horizontal direction, and namely, the first ratio is 2. There are two chroma samples for every four luminance samples in the vertical direction, and namely, the second ratio is 2.

If it is judged that the position information of the current pixel point meets the above formula (1), namely, the first horizontal coordinate of the current pixel point is an integer multiple of the first ratio and the first vertical coordinate is an integer multiple of the second ratio, the first position is determined according to the first horizontal coordinate, the first ratio, the first vertical coordinate and the second ratio, the chroma value of the reference pixel of the current pixel point serves as the chroma prediction sample at the first position, and the chroma prediction sample at the first position serves as the chroma prediction sample of the current pixel point.

In some embodiments, determining the first position according to the first horizontal coordinate, the first ratio, the first vertical coordinate and the second ratio in S830-A1 includes but not limited to following modes:

Mode 1: Perform division on the first horizontal coordinate and the first ratio to obtain a first numerical value with an integer part determined as a horizontal coordinate of the first position. In a similar way, perform division on the first vertical coordinate and the second ratio to obtain a second numerical value with an integer part determined as a vertical coordinate of the first position.

Mode 2: Determine an exact division value of the first horizontal coordinate and the first ratio as a horizontal coordinate of the first position. Determine an exact division value of the first vertical coordinate and the second ratio as a vertical coordinate of the first position.

In an example of the Mode 2, pixel chroma is used for representing a chroma value of the reference pixel value of the current pixel point, pic_chroma represents a chroma value of the current pixel point, and a value of pic_chroma (x/scale_x, y/scale_y) is set to be pixel chroma.

When the color sampling mode of the current picture block is YUV4:2:2 or YUV4:2:0, a process of determining a chroma prediction sample of the current picture block is introduced below.

For example, assuming that the size of the current picture block is 4×4 shown in FIG. 9A, coordinates of each pixel point in the current picture block are shown in FIG. 9A.

EXAMPLE 1

When the color sampling mode of the current picture block is YUV4:2:0, the first ratio is 2 and the second ratio is 2, the chroma prediction sample of the current picture block is determined according to a following formula (2) and a formula (3):

$$x \% 2==0 \;\text{且}\; y \% 2==0 \tag{2}$$

$$\text{pic\_chroma}(x/2, y/2) = \text{pixel\_chroma} \tag{3}$$

where, / is an exact division sign, pixel chroma represents a chroma value of a reference pixel value of a current pixel point, and pic_chroma represents a chroma value of the current pixel point.

It is to be described that only when the position information of the current pixel point meets the above formula (2), the following formula (3) is executed to obtain the chroma prediction sample of the current pixel point.

Specifically, if the coordinates of the current pixel point are (0, 0) and meet the above formula (2), a value of pic_chroma (0, 0) is set to be pixel chroma according to the formula (3). If the coordinates of the current pixel point are (0, 2) and meet the above formula (2), a value of pic_chroma (0, 1) is set to be pixel_chroma according to the formula (3). If the coordinates of the current pixel point are (2, 0) and meet the above formula (2), a value of pic_chroma (1, 0) is set to be pixel chroma according to the formula (3). If the coordinates of the current pixel point are (2, 2) and meet the above formula (2), a value of pic_chroma (1, 1) is set to be pixel chroma according to the formula (3). If the coordinates of the current pixel point are (0,1), (0,1), (0,3), (1,0), (1,1), (1,2), (1,3), (2,1), (2,3), (3,0), (3,1), (3,2) and (3,3) and do not meet the above formula (2), the formula (3) is not executed.

On that basis, the determined chroma prediction sample of the current picture block is shown in FIG. 9B and is 2×2 in size.

EXAMPLE 2

When the color sampling mode of the current picture block is YUV4:2:2, the first ratio is 2 and the second ratio is 1, the chroma prediction sample of the current picture block is determined according to a following formula (4) and a formula (5):

$$x \% 2=0 \;\text{且}\; y \% 1==0 \tag{4}$$

$$\text{pic\_chroma}(x/2, y/1) = \text{pixel\_chroma} \tag{5}$$

where / is an exact division sign, pixel chroma represents a chroma value of a reference pixel value of a current pixel point, and pic_chroma represents a chroma value of the current pixel point.

It is to be described that only when the position information of the current pixel point meets the above formula (4), the following formula (5) is executed to obtain the chroma prediction sample of the current pixel point.

Specifically, if the coordinates of the current pixel point are (0, 0) and meet the above formula (4), a value of pic_chroma (0, 0) is set to be pixel chroma according to the formula (5). If the coordinates of the current pixel point are (0, 1) and meet the above formula (4), a value of pic_chroma (0, 1) is set to be pixel chroma according to the formula (5). If the coordinates of the current pixel point are (0, 2) and meet the above formula (4), a value of pic_chroma (0, 2) is set to be pixel chroma according to the formula (5). If the coordinates of the current pixel point are (0, 3) and meet the above formula (4), a value of pic_chroma (0, 3) is set to be pixel chroma according to the formula (5). If the coordinates of the current pixel point are (2, 0) and meet the above formula (4), a value of pic_chroma (1, 0) is set to be pixel chroma according to the formula (5). If the coordinates of the current pixel point are (2, 1) and meet the above formula (4), a value of pic_chroma (1, 1) is set to be pixel chroma according to the formula (5). If the coordinates of the current pixel point are (2, 2) and meet the above formula (4), a value of pic_chroma (1, 2) is set to be pixel chroma according to the formula (5). If the coordinates of the current pixel point are (2, 3) and meet the above formula (4), a value of pic_chroma (1, 3) is set to be pixel chroma according to the formula (5). If the coordinates of the current pixel point are (1,0), (1,1), (1,2), (1,3), (3,0), (3,1), (3,2) and (3,3) and do not meet the above formula (4), the formula (5) is not executed.

On that basis, the determined chroma prediction sample of the current picture block is shown in FIG. 9C, and is 2×4 in size.

Figure 10:
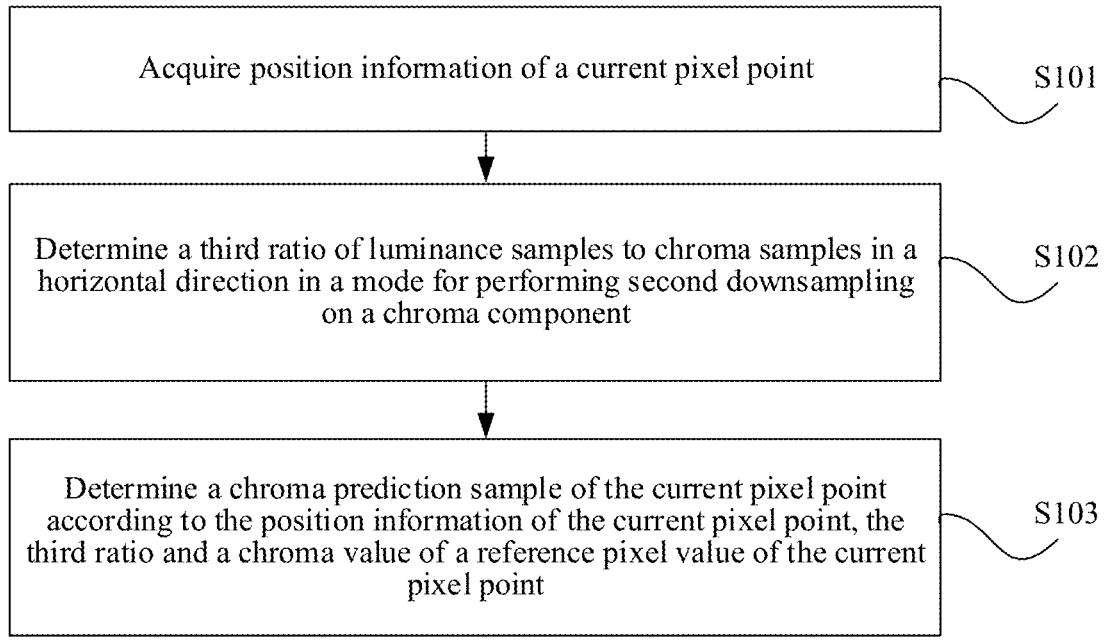
FIG. 10 is a schematic flowchart of another method for determining a prediction sample of a picture block according to an embodiment of this disclosure.

In some embodiments, if a prediction sample of a current pixel point includes a chroma prediction sample, and when a color sampling mode of a current picture block is a mode for performing second downsampling on a chroma component, S640 includes steps shown in FIG. 10.

FIG. 10 is a schematic flowchart of another method for determining a prediction sample of a picture block according to an embodiment of this disclosure, and as shown in FIG. 10, S640 includes the following steps:

S101: Acquire position information of a current pixel point.

S101 above is the same with S801 in implementation, and is not repeatedly described in reference to description in S801.

S102: Determine a third ratio of luminance samples to chroma samples in a horizontal direction in a mode for performing second downsampling on a chroma component.

The third ratio may also be a target value. Exemplarily, if the color sampling mode of the current picture block is YUV4:2:2, as shown in FIG. 7A, there are two chroma samples for every four luminance samples in the horizontal direction, and namely, the third ratio is 2.

S103: Determine a chroma prediction sample of the current pixel point according to the position information of the current pixel point, the third ratio and a chroma value of a reference pixel value of the current pixel point.

Specifically, a decoding end determines a second position of the chroma prediction sample of the current pixel point according to the position information of the current pixel point and the third ratio, and the chroma prediction sample at the second position serves as the chroma prediction sample of the current pixel point.

In some embodiments, position information includes a first horizontal coordinate and a first vertical coordinate, and S130 includes following steps from S103-A1 to S103-A3:

S103-A1: Determine a second position according to a first horizontal coordinate, a third ratio and a first vertical coordinate if the first horizontal coordinate is an integer multiple of the third ratio.

S103-A2: Adopt a chroma value of a reference pixel of a current pixel point as a chroma prediction sample at the second position.

S103-A3: Adopt the chroma prediction sample at the second position as a chroma prediction sample of the current pixel point.

For example, position information of the current pixel point is (x, y), where x is the first horizontal coordinate of the current pixel point, and y is the first vertical coordinate of the current pixel point. A decoding end judges whether the first horizontal coordinate of the current pixel point is an integer multiple of a first ratio or not and whether the first vertical coordinate is an integer multiple of a second ratio or not. Exemplarily, assuming that the third ratio is expressed by scale_x, judge whether the current pixel point meets a following formula (6):

$$x \ \% \ \text{scale\_}x == 0 \qquad (6)$$

where, % is remainder operation, and == is equal.

If the color sampling mode of the current picture block is YUV4:2:2, scale_x is 2.

If it is judged that the position information of the current pixel point meets the above formula (6), namely, the first horizontal coordinate of the current pixel point is an integer multiple of the third ratio, the second position is determined according to the first horizontal coordinate and the third ratio, the chroma value of the reference pixel of the current pixel point serves as the chroma prediction sample at the second position, and the chroma prediction sample at the second position serves as the chroma prediction sample of the current pixel point.

In some embodiments, determining the second position according to the first horizontal coordinate and the third ratio in S130-A1 includes but not limited to following modes:

Mode 1: Perform division on the first horizontal coordinate and the third ratio to obtain a third numerical value with an integer part determined as a horizontal coordinate of the second position; and determine the first vertical coordinate as a vertical coordinate of the second position.

Mode 2: Determine an exact division value of the first horizontal coordinate and the third ratio as a horizontal coordinate of the second position; and determine the first vertical coordinate as a vertical coordinate of the second position.

In an example of the Mode 2, pixel chroma is used for representing a chroma value of a reference pixel of a current pixel point, pic_chroma represents a chroma value of the current pixel point, and a value of pic_chroma (x/scale x, y) is set to be pixel chroma.

When the color sampling mode of the current picture block is YUV4:2:2, a process of determining the chroma prediction sample of the current picture block is introduced below.

For example, assuming that the size of the current picture block is 4×4 shown in FIG. 9A, coordinates of each pixel point in the current picture block are shown in FIG. 9A.

If the color sampling mode of the current picture block is YUV4:2:2, the third ratio is 2, and the chroma prediction sample of the current picture block is determined according to a following formula (7) and a formula (8):

$$x \ \%\_2 == 0 \qquad (7)$$

$$\text{pic\_chroma}(x/2, y) = \text{pixel\_chroma} \qquad (8)$$

where, / is an exact division sign, pixel chroma represents a chroma value of a reference pixel value of a current pixel point, and pic_chroma represents a chroma value of the current pixel point.

It is to be described that only when the position information of the current pixel point meets the above formula (7), the following formula (8) is executed to obtain the chroma prediction sample of the current pixel point.

Specifically, if the coordinates of the current pixel point are (0, 0) and meet the above formula (7), a value of pic_chroma (0, 0) is set to be pixel chroma according to the formula (8). If the coordinates of the current pixel point are (0, 1) and meet the above formula (7), a value of pic_chroma (0, 1) is set to be pixel chroma according to the formula (8). If the coordinates of the current pixel point are (0, 2) and meet the above formula (7), a value of pic_chroma (0, 2) is set to be pixel chroma according to the formula (8). If the coordinates of the current pixel point are (0, 3) and meet the above formula (7), a value of pic_chroma (0, 3) is set to be pixel chroma according to the formula (8). If the coordinates of the current pixel point are (2, 0) and meet the above formula (7), a value of pic_chroma (1, 0) is set to be pixel chroma according to the formula (8). If the coordinates of the current pixel point are (2, 1) and meet the above formula (7), a value of pic_chroma (1, 1) is set to be pixel chroma according to the formula (8). If the coordinates of the current pixel point are (2, 2) and meet the above formula (7), a value of pic_chroma (1, 2) is set to be pixel chroma according to the formula (8). If the coordinates of the current pixel point are (2, 3) and meet the above formula (7), a value of pic_chroma (1, 3) is set to be pixel chroma according to the formula (8). If the coordinates of the current pixel point are (1,0), (1,1), (1,2), (1,3), (3,0), (3,1), (3,2) and (3,3) and do not meet the above formula (7), the formula (8) is not executed.

On that basis, the determined chroma prediction sample of the current picture block is shown in FIG. 9C, and is 4×2 in size.

In the embodiment of this disclosure, if the prediction sample of the current pixel point includes the chroma prediction sample, and when the color sampling mode of the current picture block is YUV4:2:2, the position information of the current pixel point is acquired; the third ratio of the luminance samples to the chroma samples in the horizontal direction in the color sampling mode being YUV4:2:2 is determined; and the chroma prediction sample of the current pixel point is rapidly determined according to the position information of the current pixel point, the third ratio and the chroma value of the reference pixel of the current pixel point, where the process is simple.

It is to be understood that FIG. 6 and FIG. 8-FIG. 10 are only examples of this disclosure rather than understood as limitations on this disclosure.

The exemplary implementations of this disclosure are described in detail above with reference to the accompanying drawings. However, this disclosure is not limited to the specific details in the foregoing implementations. A plurality of simple deformations may be made to the technical solution of this disclosure within a range of the technical concept of this disclosure, and these simple deformations fall within the protection scope of this disclosure. For example, the specific technical features described in the above specific implementations may be combined in any suitable manner without contradiction. To avoid unnecessary repetition, various possible combinations are not further described in this disclosure. For another example, various different implementations of this disclosure may alternatively be combined. Such combinations should also be considered as the content disclosed in this disclosure provided that these combinations do not depart from the concept of this disclosure.

It should be further understood that sequence numbers of the foregoing processes do not mean execution sequences in various method embodiments of this disclosure. The execution sequences of the processes should be determined according application functions and internal logic of the processes, and should not be construed as any limitation on the implementation processes of the embodiments of this disclosure. In addition, the term "and/or" in the embodiments of this disclosure, describes only an association relationship for describing associated objects and represents that three relationships may exist. Specifically, A and/or B may represent: Only A exists, both A and B exist, and only B exists. In addition, the character "/" in this specification generally indicates an "or" relationship between the associated objects.

The embodiments of the method of this disclosure are described in detail above in combination with FIG. 6-FIG. 10, and embodiments of an apparatus of this disclosure are described in detail in combination with FIG. 11-FIG. 12 below.

Figure 11:
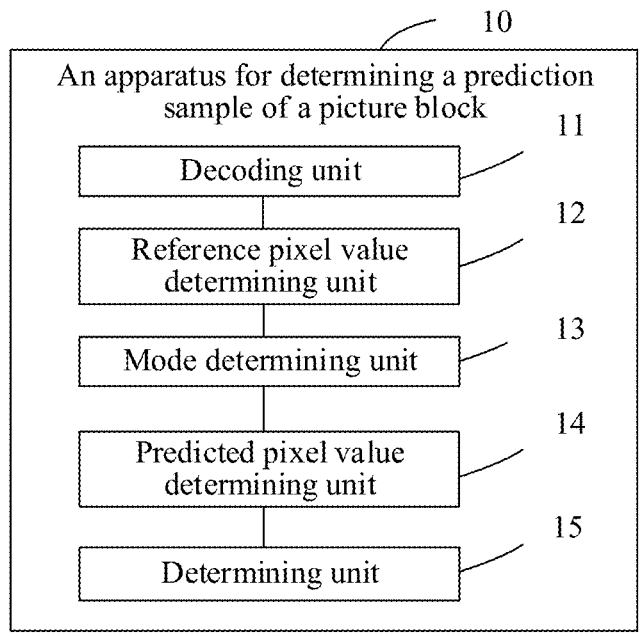
FIG. 11 is a schematic block diagram of an apparatus for determining a prediction sample of a picture block according to an embodiment of this disclosure.

FIG. 11 is a schematic block diagram of an apparatus for determining a prediction sample of a picture block according to an embodiment of this disclosure, and the apparatus may belong to a decoding end, such as a decoding device. The apparatus may belong to a coding end, such as a coding device.

As shown in FIG. 11, the apparatus 10 for determining the prediction sample of the picture block may include:
- a decoding unit 11 configured to decode a code stream and acquire a type of a current string where a current pixel point in a current picture block is located;
- a reference pixel value determining unit 12 configured to determine a reference pixel value of the current pixel point according to the type of the current string;
- a mode determining unit 13 configured to determine a color sampling mode of the current picture block;
- a prediction sample determining unit 14 configured to obtain a prediction sample of the current pixel point according to the color sampling mode of the current picture block and the reference pixel value of the current pixel point; and
- a determining unit 15 configured to obtain a prediction sample of the current picture block according to the prediction sample of the current pixel point.

In some embodiments, the type of a current string includes any one of: an equivalence string, an unmatched pixel and a unit-based vector string.

In some embodiments, if the type of a current string is an equivalence string, a reference pixel value determining unit 12 is specifically configured to decode a code stream to obtain an index of a reference pixel value corresponding to the current string, inquire a preset reference pixel prediction list for the reference pixel value corresponding to the index, and determine the reference pixel value corresponding to the index as a reference pixel value of a current pixel point;
if the type of a current string is an unmatched pixel, a reference pixel value determining unit is specifically configured to decode a code stream to obtain a predicted value of a current pixel point, and determine the predicted value of the current pixel point as a reference pixel value of the current pixel point; and
if the type of a current string is a unit-based vector ring, a reference pixel value determining unit is specifically configured to determine a value of an adjacent decoded pixel point above a current pixel point as a reference pixel value of a current pixel point.

In some embodiments, if a prediction sample of a current pixel point includes a luminance prediction sample, a prediction sample determining unit 14 is specifically configured to determine a luminance value of a reference pixel of the current pixel point as the luminance prediction sample of the current pixel point if a color sampling mode of a current picture block is a mode for downsampling a chroma component.

In some embodiments, if a prediction sample of a current pixel point includes a chroma prediction sample, a prediction sample determining unit 14 is specifically configured to acquire position information of the current pixel point; determine a first ratio of luminance samples to chroma samples in a horizontal direction and a second ratio of luminance samples to chroma samples in a vertical direction according to a color sampling mode of a current picture block; and determine the chroma prediction sample of the current pixel point according to the position information of the current pixel point, the first ratio, the second ratio and a chroma value of a reference pixel of the current pixel point.

In some embodiments, position information includes a first horizontal coordinate and a first vertical coordinate, a prediction sample determining unit 14 is specifically configured to determine a first position according to a first horizontal coordinate, a first ratio, a first vertical coordinate and a second ratio if the first horizontal coordinate is an integer multiple of the first ratio and the first vertical coordinate is an integer multiple of the second ratio; adopt the chroma value of the reference pixel of the current pixel point as a chroma prediction sample at the first position; and adopt the chroma prediction sample at the first position as a chroma prediction sample of the current pixel point.

In some embodiments, a prediction sample determining unit 14 is specifically configured to determine an exact division value of a first horizontal coordinate and a first ratio as a horizontal coordinate of a first position; and determine an exact division value of a first vertical coordinate and a second ratio as a vertical coordinate of the first position.

In some embodiments, if a color sampling mode of a current picture block is a mode for performing first downsampling on a chroma component, a first ratio and a second ratio are both target values; and if a color sampling mode of a current picture block is a mode for performing second downsampling on a chroma component, a first ratio is a target value, and a second ratio is a half of the target value.

In some embodiments, if a prediction sample of a current pixel point includes a chroma prediction sample and a color sampling mode of a current picture block is a mode for performing second downsampling on a chroma component, a prediction sample determining unit 14 is specifically configured to acquire position information of the current pixel point; determine a third ratio of luminance samples to chroma samples in a horizontal direction in a color sampling mode for performing second downsampling on the chroma component; and determine the chroma prediction sample of the current pixel point according to the position information of the current pixel point, the third ratio and a chroma value of a reference pixel of the current pixel point.

In some embodiments, position information includes a first horizontal coordinate and a first vertical coordinate, a prediction sample determining unit 14 is specifically configured to determine a second position according to the first horizontal coordinate, a third ratio and the first vertical coordinate if the first horizontal coordinate is an integer multiple of the third ratio; adopt a chroma value of a reference pixel of a current pixel point as a chroma prediction sample at the second position; and adopt the chroma prediction sample at the second position as a chroma prediction sample of the current pixel point.

In some embodiments, a prediction sample determining unit 14 is specifically configured to determine an exact division value of a first horizontal coordinate and a third ratio as a horizontal coordinate of a second position; and determine a first vertical coordinate as a vertical coordinate of the second position.

In an embodiment, the third ratio is a target value.

In some embodiments, a mode determining unit 13 is specifically configured to decode a code stream to acquire a color sampling mode of a current picture block.

It is to be understood that the embodiments of the apparatus may correspond to the embodiments of the method, and similar descriptions may refer to the embodiments of the method. To avoid repetition, details are not described herein again. Specifically, the apparatus shown in FIG. 11 may execute an embodiment of a method corresponding to a decoding end, previous descriptions and other operations and/or functions of various modules in the apparatus achieve corresponding processes of the embodiment of the method corresponding to the decoding end, and for concision, it is unnecessary to repeat herein.

The apparatus of the embodiment of this apparatus is described from function modules in combination with above accompanying drawings. It is to be understood that the function modules may be achieved in a hardware form, may also be achieved through instructions in a software form, and may also be achieved through combination of a hardware module and a software module. Specifically, the steps of the embodiment of the method in the embodiment of this disclosure may be finished by an integrated logic circuit of hardware in a processor and/or instructions in the software form, may be directly executed by a hardware decoding processor in combination with the steps of the method disclosed in the embodiment of this disclosure, or be executed through combination of the hardware module and the software module in the decoding processor. The software module may be located in a mature storage medium in the art, such as a random access memory, a flash memory, a read-only memory, a programmable read-only memory, an electrically-erasable programmable memory, or a register. The storage medium is located in the memory. The processor (including processing circuitry) reads information in the memory (including a non-transitory computer-readable storage medium) and completes the steps of the foregoing method embodiments in combination with hardware thereof.

Figure 12:
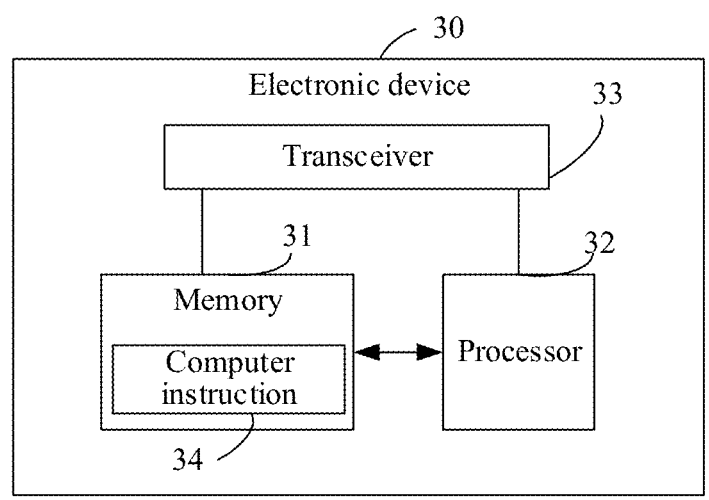
FIG. 12 is a schematic block diagram of an electronic device according to an embodiment of this disclosure.

FIG. 12 is a schematic block diagram of an electronic device 30 according to an embodiment of this disclosure, and the electronic device 30 may be a decoding device and may also be a coding device.

As shown in FIG. 12, the electronic device 30 may be a video decoder in the embodiment and may include:

a memory 31 and a processor 32, and the memory 31 is configured to store computer instructions 34 and transmit program codes 34 to the processor 32. In other words, the processor 32 may invoke and operate the computer instructions 34 from the memory 31 so as to achieve the method in the embodiment of this disclosure.

For example, the processor 32 may be configured to execute steps in the above method 200 according to the computer instructions 34.

In some embodiments of this disclosure, a processor 32 may include but not limited to:

a general-purpose processor, a digital signal processor (DSP), an application specific integrated circuit (ASIC), a field programmable gate array (FPGA), or another programmable logical device, discrete gate or transistor logical device, discrete hardware component, or the like.

In some embodiments of this disclosure, a processor 33 may include but not limited to:

a volatile memory and/or a non-volatile memory. The non-volatile memory may be a read-only memory (ROM), a programmable ROM (PROM), an erasable programmable read-only memory (EPROM), an electrically EPROM (EEPROM), or a flash memory. The volatile memory may be a random access memory (RAM), and is used as an external cache. Through exemplary but not limitative description, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synch link DRAM (SLDRAM) and a direct rambus RAM (DR RAM).

In some embodiments of this disclosure, computer instructions 34 may be divided into one or more units, and the one or more units are stored in a memory 31 and executed by a processor 32 so as to finish the method provided by this disclosure. The one or more units may be a series of computer instruction segments capable of finishing specific functions, and the instruction segments are used for describing an execution process of the computer instructions 34 in an electronic device 30.

As shown in FIG. 12, the electronic device 30 may further include:

a transceiver 33 connected to the processor 32 or the memory 31.

The processor 32 may control the transceiver 33 to communicate with other devices, specifically, may transmit information or data to other devices, or receives information or data transmitted by other devices. The transceiver 33 may include a transmitter and a receiver. The transceiver 33 may further include one or more antennas.

It is understood that various components of the electronic device 30 are connected to each other by using a bus system. In addition to including a data bus, the bus system further includes a power bus, a control bus, and a status signal bus.

This disclosure further provides a computer storage medium, storing computer instructions, the computer programs, when executed by a computer, causing the computer to perform the methods in the foregoing method embodiments. Or, an embodiment of this disclosure further provides a computer program product including instructions, the instructions, when executed by a computer, causing the computer to perform the methods in the foregoing method embodiments.

When software is used for implementation, all or some of the embodiments may be implemented in a form of a computer program product. The computer program product includes one or more computer instructions. When the program instruction of the computer is loaded and executed on the computer, the procedure or functions according to the embodiments of this disclosure are all or partially generated. The computer may be a general-purpose computer, a special-purpose computer, a computer network, or another programmable apparatus. The computer instructions may be stored in a computer-readable storage medium, or transmitted from one computer-readable storage medium to another computer-readable storage medium. For example, the computer instructions may be transmitted from one website, computer, server, or data center to another website, computer, server, or data center in a wired (such as, a coaxial cable, an optical fiber, or a digital subscriber line (DSL)) or wireless (such as, infrared, radio, or microwave) manner. The computer-readable storage medium may be any usable medium accessible by a computer, or a data storage device, such as a server or a data center, including one or more usable media. The usable media may be a magnetic medium (such as a floppy disk, a hard disk, or a magnetic tape), an optical medium (such as a digital video disc (DVD)), a semiconductor medium (such as a solid state disk (SSD)) or the like.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this disclosure.

In the several embodiments provided in this disclosure, it is to be understood that the disclosed system, apparatus, and method may be implemented in other manners. For example, the apparatus embodiments described above are merely exemplary. For example, the division of the units is merely the division of logic functions, and may use other division manners during actual implementation. For example, a plurality of units or components may be combined, or may be integrated into another system, or some features may be omitted or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate components may or may not be physically separate, and components displayed as units may or may not be physical units, may be located in one position, or may be distributed on a plurality of network units. Some of or all of the units may be selected according to actual needs to achieve the objectives of the solutions in the embodiments. For example, functional units in the embodiments of this disclosure may be integrated into one processing unit, or each of the units may be physically separated, or two or more units may be integrated into one unit.

The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

The foregoing disclosure includes some exemplary embodiments of this disclosure which are not intended to limit the scope of this disclosure. Other embodiments shall also fall within the scope of this disclosure.

What is claimed is:

1. A method for determining a prediction sample of a picture block, the method comprising:
   acquiring a type of a current pixel string where a current pixel in a current picture block is located;
   determining a reference pixel value of the current pixel according to the type of the current pixel string;
   obtaining a prediction sample of the current pixel according to a color sampling mode of the current picture block and the reference pixel value of the current pixel, such that a color sampling mode of the obtained prediction sample is consistent with the color sampling mode of the current picture block, the reference pixel value of the current pixel being obtained based on the color sampling mode of the current picture block when the obtained prediction sample comprises a luminance prediction sample, and the color sampling mode of the obtained luminance prediction sample being set to the color sampling mode of the current picture block; and
   obtaining prediction values of the current picture block according to the prediction sample of the current pixel.

2. The method according to claim 1, wherein the type of the current pixel string comprises one of: an equivalence string, an unmatched pixel or a unit-based vector string.

3. The method according to claim 2, wherein the determining comprises:
   when the type of the current pixel string is the equivalence string, acquiring an index of the reference pixel value corresponding to the current pixel string, checking a preset reference pixel prediction list for the reference pixel value corresponding to the index, and determining the reference pixel value corresponding to the index as the reference pixel value of the current pixel;
   when the type of the current pixel string is the unmatched pixel, acquiring a predicted value of the current pixel, and determining the predicted value of the current pixel as the reference pixel value of the current pixel; and
   when the type of the current pixel string is the unit-based vector string, determining a value of an adjacent decoded pixel above the current pixel as the reference pixel value of the current pixel.

4. The method according to claim 1, wherein, when the prediction sample of the current pixel comprises the luminance prediction sample, the obtaining the prediction sample of the current pixel comprises:
   determining a luminance value of the reference pixel value of the current pixel as the luminance prediction sample of the current pixel when the color sampling mode of the current picture block is a mode for down-sampling a chroma component in which a chroma prediction sample of the current pixel is determined based on a ratio of luminance samples to chroma samples specified by the color sampling mode of the current picture block.

5. The method according to claim 1, wherein when the prediction sample of the current pixel comprises a chroma prediction sample, the obtaining the prediction sample of the current pixel comprises:
   acquiring position information of the current pixel;
   determining a first ratio of luminance samples to chroma samples in a horizontal direction and a second ratio of the luminance samples to the chroma samples in a vertical direction according to the color sampling mode of the current picture block; and determining the chroma prediction sample of the current pixel according to the position information of the current pixel, the first ratio, the second ratio, and a chroma value of a reference pixel of the current pixel.

6. The method according to claim 5, wherein
the position information comprises a first horizontal coordinate and a first vertical coordinate, and
the determining the chroma prediction sample of the current pixel according to the position information of the current pixel, the first ratio, the second ratio, and the chroma value of the reference pixel of the current pixel comprises:
when the first horizontal coordinate is an integer multiple of the first ratio and the first vertical coordinate is an integer multiple of the second ratio,
determining a first position according to the first horizontal coordinate, the first ratio, the first vertical coordinate, and the second ratio;
adopting the chroma value of the reference pixel of the current pixel as a chroma prediction sample at the first position; and
adopting the chroma prediction sample at the first position as the chroma prediction sample of the current pixel.

7. The method according to claim 6, wherein the determining the first position according to the first horizontal coordinate, the first ratio, the first vertical coordinate and the second ratio comprises:
determining an exact division value of the first horizontal coordinate and the first ratio as a horizontal coordinate of the first position; and
determining an exact division value of the first vertical coordinate and the second ratio as a vertical coordinate of the first position.

8. The method according to claim 5, wherein the determining the first ratio and the second ratio comprises:
when the color sampling mode of the current picture block is a mode for performing first downsampling on a chroma component, determining the first ratio and the second ratio as target values; and
when the color sampling mode of the current picture block is a mode for performing second downsampling on the chroma component, determining the first ratio as a target value, and the second ratio being a half of the target value.

9. The method according to claim 2, wherein, when the prediction sample of the current pixel comprises a chroma prediction sample and the color sampling mode of the current picture block is a mode for performing second downsampling on a chroma component, the obtaining the prediction sample of the current pixel comprises:
acquiring position information of the current pixel;
determining a third ratio of luminance samples to chroma samples in a horizontal direction in the mode for performing the second downsampling on the chroma component; and
determining the chroma prediction sample of the current pixel according to the position information of the current pixel, the third ratio, and a chroma value of a reference pixel of the current pixel.

10. The method according to claim 9, wherein the position information comprises a first horizontal coordinate and a first vertical coordinate, and the determining the chroma prediction sample of the current pixel according to the position information of the current pixel, the third ratio and the chroma value of the reference pixel of the current pixel comprises:

determining a second position according to the first horizontal coordinate, the third ratio and the first vertical coordinate in response to the first horizontal coordinate being an integer multiple of the third ratio;
adopting the chroma value of the reference pixel of the current pixel as the chroma prediction sample at the second position; and
adopting the chroma prediction sample at the second position as the chroma prediction sample of the current pixel.

11. The method according to claim 10, wherein the determining the second position according to the first horizontal coordinate, the third ratio and the first vertical coordinate comprises:
determining an exact division value of the first horizontal coordinate and the third ratio as a horizontal coordinate of the second position; and
determining the first vertical coordinate as a vertical coordinate of the second position.

12. An apparatus for determining a prediction sample of a picture block, comprising:
processing circuitry configured to
acquire a type of a current pixel string where a current pixel in a current picture block is located;
determine a reference pixel value of the current pixel according to the type of the current pixel string;
obtain a prediction sample of the current pixel according to a color sampling mode of the current picture block and the reference pixel value of the current pixel, such that a color sampling mode of the obtained prediction sample is consistent with the color sampling mode of the current picture block, the reference pixel value of the current pixel being obtained based on the color sampling mode of the current picture block when the prediction sample comprises a luminance prediction sample, and the color sampling mode of the obtained luminance prediction sample being set to the color sampling mode of the current picture block; and
obtain prediction values of the current picture block according to the prediction sample of the current pixel.

13. The apparatus according to claim 12, wherein the type of the current pixel string comprises one of: an equivalence string, an unmatched pixel or a unit-based vector string.

14. The apparatus according to claim 13, wherein
when the type of the current pixel string is the equivalence string, the processing circuitry is configured to decode a code stream to obtain an index of the reference pixel value corresponding to the current pixel string, check a preset reference pixel prediction list for the reference pixel value corresponding to the index, and determine the reference pixel value corresponding to the index as the reference pixel value of the current pixel;
when the type of the current pixel string is the unmatched pixel, the processing circuitry is configured to decode the code stream to obtain a predicted value of the current pixel, and determine the predicted value of the current pixel as the reference pixel value of the current pixel; and
when the type of the current pixel string is the unit-based vector string, the processing circuitry is configured to determine a value of an adjacent decoded pixel above the current pixel as the reference pixel value of the current pixel.

15. The apparatus according to claim 13, wherein, when the prediction sample of the current pixel comprises the luminance prediction sample, the processing circuitry is configured to determine a luminance value of a reference pixel of the current pixel as the luminance prediction sample of the current pixel when the color sampling mode of the current picture block is a mode for downsampling a chroma component in which a chroma coordinate associated with the current pixel is determined based on a ratio of luminance samples to chroma samples specified by the color sampling mode.

16. The apparatus according to claim 13, wherein, when the prediction sample of the current pixel comprises a chroma prediction sample, the processing circuitry is configured to:
    acquire position information of the current pixel;
    determine a first ratio of luminance samples to chroma samples in a horizontal direction and a second ratio of the luminance samples to the chroma samples in a vertical direction according to the color sampling mode of the current picture block; and
    determine the chroma prediction sample of the current pixel according to the position information of the current pixel, the first ratio, the second ratio and a chroma value of a reference pixel of the current pixel.

17. The apparatus according to claim 16, wherein
    the position information comprises a first horizontal coordinate and a first vertical coordinate, and
    the processing circuitry is further configured to:
        when the first horizontal coordinate is an integer multiple of the first ratio and the first vertical coordinate is an integer multiple of the second ratio,
            determine a first position according to the first horizontal coordinate, the first ratio, the first vertical coordinate, and the second ratio;
            adopt the chroma value of the reference pixel of the current pixel as a chroma prediction sample at the first position; and
            adopt the chroma prediction sample at the first position as the chroma prediction sample of the current pixel.

18. The apparatus according to claim 17, wherein the processing circuitry is further configured to:
    determine an exact division value of the first horizontal coordinate and the first ratio as a horizontal coordinate of the first position; and
    determine an exact division value of the first vertical coordinate and the second ratio as a vertical coordinate of the first position.

19. The apparatus according to claim 16, wherein the processing circuitry is further configured to:
    when the color sampling mode of the current picture block is a mode for performing first downsampling on a chroma component, determine the first ratio and the second ratio as target values; and
    when the color sampling mode of the current picture block is a mode for performing second downsampling on the chroma component, determine the first ratio as a target value, and the second ratio is half of the target value.

20. A non-transitory computer-readable storage medium storing computer-readable instructions thereon, which, when executed by a computer device, cause the computer device to perform a method for determining a prediction sample of a picture block, the method comprising:
    acquiring a type of a current pixel string where a current pixel in a current picture block is located;
    determining a reference pixel value of the current pixel according to the type of the current pixel string;
    obtaining a prediction sample of the current pixel according to a color sampling mode of the current picture block and the reference pixel value of the current pixel, such that a color sampling mode of the obtained prediction sample is consistent with the color sampling mode of the current picture block, the reference pixel value of the current pixel being obtained based on the color sampling mode of the current picture block when the prediction sample comprises a luminance prediction sample, and the color sampling mode of the obtained luminance prediction sample being set to the color sampling mode of the current picture block; and
    obtaining prediction values of the current picture block according to the prediction sample of the current pixel.

* * * * *